United States Patent
Ferdinand et al.

(10) Patent No.: US 11,177,995 B2
(45) Date of Patent: Nov. 16, 2021

(54) METHODS AND APPARATUS FOR COMMUNICATING A SINGLE CARRIER WAVEFORM

(71) Applicants: Nuwan Suresh Ferdinand, Stittsville (CA); Ming Jia, Ottawa (CA); Jianglei Ma, Ottawa (CA)

(72) Inventors: Nuwan Suresh Ferdinand, Stittsville (CA); Ming Jia, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 16/782,453

(22) Filed: Feb. 5, 2020

(65) Prior Publication Data
US 2021/0243065 A1 Aug. 5, 2021

(51) Int. Cl.
H04L 27/36 (2006.01)
H04L 27/26 (2006.01)

(52) U.S. Cl.
CPC ........ H04L 27/362 (2013.01); H04L 27/2607 (2013.01); H04L 27/2628 (2013.01); H04L 27/2636 (2013.01)

(58) Field of Classification Search
CPC .............. H04L 27/362; H04L 27/2601; H04L 27/2607; H04L 27/2626; H04L 27/2627; H04L 27/2628; H04L 27/2634; H04L 27/2636; H04L 27/26526; H04L 27/2643
See application file for complete search history.

(56) References Cited

U.S. PATENT DOCUMENTS

| | | | | |
|---|---|---|---|---|
| 7,457,295 | B2* | 11/2008 | Saunders | H04B 1/715 370/322 |
| 9,209,936 | B1* | 12/2015 | Jia | H04L 1/0054 |
| 9,379,917 | B2* | 6/2016 | Vilaipornsawai | H04L 25/03114 |
| 9,479,381 | B2* | 10/2016 | Siohan | H04L 27/2698 |
| 9,628,317 | B2* | 4/2017 | Gaspar | H04L 27/3494 |
| 9,787,515 | B2* | 10/2017 | Vilaipornsawai | H04L 27/34 |
| 9,973,363 | B1* | 5/2018 | Tunali | H04L 27/265 |
| 10,009,209 | B2* | 6/2018 | Zhu | H04L 27/2602 |
| 10,044,544 | B2* | 8/2018 | Zhao | H04L 1/0625 |

(Continued)

FOREIGN PATENT DOCUMENTS

| | | |
|---|---|---|
| EP | 3032790 B1 | 2/2018 |
| WO | 2019013938 A1 | 1/2019 |

OTHER PUBLICATIONS

Idaho National Laboratory,"Low PAPR Single Carrier Circularly Pulse Shaped Waveform", 3GPP TSG-RAN WG1 #86, R1-166494, Aug. 22-26, 2016, Gothenburg, Sweden, total 9 pages.

*Primary Examiner* — James M Perez

(57) ABSTRACT

Aspects of the present application provide methods and devices for time domain implementation of a single carrier waveform such as single carrier quadrature amplitude modulation (QAM) DFT-s-OFDM and single carrier Offset QAM (OQAM). A time domain implementation allows flexible symbol lengths, lower implementation complexity as a large IDFT operation is not required in the time domain and support for variable cyclic prefix (CP) length. An OQAM implementation utilizes a pre-processing step to convert a K complex QAM symbol sequence into a 2K OQAM symbol sequence and generates a sequence for transmission in the time domain as opposed to the frequency domain.

24 Claims, 13 Drawing Sheets

(56) References Cited

U.S. PATENT DOCUMENTS

| | | | |
|---|---|---|---|
| 10,135,663 B2* | 11/2018 | Qu | H04L 27/2698 |
| 10,230,547 B2* | 3/2019 | Nadal | H04L 25/022 |
| 10,419,257 B2* | 9/2019 | Abdoli | H04L 27/2605 |
| 10,454,740 B2* | 10/2019 | Zhu | H04L 27/2602 |
| 10,454,746 B2* | 10/2019 | Abdoli | H04L 27/2634 |
| 10,594,531 B2* | 3/2020 | Baltar | H04L 27/264 |
| 10,652,072 B2* | 5/2020 | Moradi | H04L 27/3494 |
| 10,680,870 B2* | 6/2020 | Levinbook | H04L 27/2078 |
| 10,700,907 B2* | 6/2020 | Sun | H04L 27/2628 |
| 10,701,685 B2* | 6/2020 | Abdoli | H04L 5/0066 |
| 10,826,657 B2* | 11/2020 | Ma | H04L 27/2602 |
| 10,931,493 B1* | 2/2021 | Ferdinand | H04L 27/2636 |
| 2002/0114380 A1* | 8/2002 | Qian | H04L 25/03343 375/222 |
| 2003/0169824 A1* | 9/2003 | Chayat | H04L 5/06 375/260 |
| 2007/0037511 A1* | 2/2007 | Capretta | H03H 17/0621 455/3.01 |
| 2008/0031376 A1 | 2/2008 | Ban | |
| 2008/0240295 A1* | 10/2008 | Kim | H04L 27/066 375/321 |
| 2009/0147762 A1* | 6/2009 | Peng | H04L 25/03866 370/342 |
| 2012/0087382 A1* | 4/2012 | Zhang | H04L 25/03968 370/480 |
| 2012/0243625 A1* | 9/2012 | Berg | H04L 27/264 375/260 |
| 2014/0192925 A1* | 7/2014 | Li | H04L 27/38 375/297 |
| 2014/0233664 A1* | 8/2014 | Abdoli | H04L 27/2628 375/261 |
| 2014/0286384 A1* | 9/2014 | Mestre Pons | H04L 27/2647 375/232 |
| 2014/0293987 A1* | 10/2014 | Zhu | H04L 5/0021 370/343 |
| 2014/0348252 A1* | 11/2014 | Siohan | H04L 27/264 375/261 |
| 2015/0092885 A1* | 4/2015 | Li | H04L 25/08 375/296 |
| 2015/0263822 A1* | 9/2015 | Abdoli | H04L 1/0052 370/329 |
| 2015/0289292 A1* | 10/2015 | Sun | H04L 27/2646 370/329 |
| 2015/0304146 A1* | 10/2015 | Yang | H04L 27/0008 370/329 |
| 2015/0351098 A1* | 12/2015 | Schellmann | H04W 72/0453 370/329 |
| 2015/0372843 A1* | 12/2015 | Bala | H04L 27/2602 375/295 |
| 2016/0006586 A1* | 1/2016 | Berardinelli | H04L 27/2607 375/295 |
| 2016/0164713 A1* | 6/2016 | Gaspar | H04L 27/2698 375/298 |
| 2016/0192353 A1* | 6/2016 | Abdoli | H04L 5/0066 370/336 |
| 2016/0211998 A1* | 7/2016 | Sun | H04L 27/264 |
| 2016/0269212 A1* | 9/2016 | Vilaipornsawai | H04L 27/2627 |
| 2017/0070377 A1* | 3/2017 | Sawahashi | H04L 25/03305 |
| 2017/0134203 A1* | 5/2017 | Zhu | H04L 27/264 |
| 2017/0310505 A1* | 10/2017 | Nadal | H04L 27/2698 |
| 2017/0310525 A1* | 10/2017 | Lin | H04L 27/2698 |
| 2017/0331663 A1* | 11/2017 | Moradi | H04L 27/3494 |
| 2018/0019905 A1* | 1/2018 | Zhu | H04L 25/03159 |
| 2018/0109410 A1* | 4/2018 | Kim | H04L 7/042 |
| 2018/0183641 A1* | 6/2018 | Lin | H04L 27/26265 |
| 2018/0212799 A1* | 7/2018 | Wang | H04L 27/2089 |
| 2018/0254936 A1* | 9/2018 | Choi | H04L 27/264 |
| 2019/0020522 A1* | 1/2019 | Sun | H04L 27/2636 |
| 2019/0052499 A1* | 2/2019 | Baltar | H04L 27/264 |
| 2019/0052500 A1* | 2/2019 | Choi | H04L 27/26416 |
| 2019/0173730 A1* | 6/2019 | Nakayama | H04L 5/005 |
| 2019/0215847 A1* | 7/2019 | Abdoli | H04W 72/02 |
| 2019/0268202 A1* | 8/2019 | Book | H04L 27/2602 |
| 2020/0092150 A1* | 3/2020 | Choi | H04L 27/2636 |
| 2020/0235973 A1* | 7/2020 | Wang | H04L 27/264 |
| 2020/0403839 A1* | 12/2020 | Carvalho | H03F 1/0294 |
| 2021/0014094 A1* | 1/2021 | Nadal | H04L 27/2639 |
| 2021/0075661 A1* | 3/2021 | Ferdinand | H04L 27/2698 |
| 2021/0099330 A1* | 4/2021 | Ferdinand | H04L 27/2621 |

* cited by examiner

METHODS AND APPARATUS FOR COMMUNICATING A SINGLE CARRIER WAVEFORM

TECHNICAL FIELD

The present disclosure relates generally to wireless communications, and in particular embodiments, to time domain implementation of a single carrier waveform.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

A single carrier transmission involves a single radio frequency carrier being used to carry information. Therefore, for a signal including multiple symbols, all of the symbols are transmitted in the single carrier frequency. Orthogonal Frequency Divisional Multiplexing (OFDM), on the other hand, uses multiple carrier signals at different radio frequencies. Therefore, for a signal including multiple symbols, some of the symbols are sent on each carrier frequency. Each transmission type has particular benefits, for example single carrier transmission has lower peak to average power ratio (PAPR) properties.

There are several types of single carrier waveforms. One type is known as Discrete Fourier Transform spread OFDM (DFT-s-OFDM), which is standardized in 3GPP. Another type is the more recently proposed single carrier Offset Quadrature Amplitude Modulation (OQAM).

DFT-s-OFDM and single carrier OQAM are implemented in the frequency domain. While there are some benefits to implementing single carrier transmission types in the frequency domain, there are also drawbacks.

Therefore, alternative mechanisms for implementing single carrier transmission would be beneficial for communication systems.

SUMMARY

Aspects of the present disclosure provide a time domain implementation for generating Offset QAM (OQAM) and DFT-s-OFDM signals. Frequency domain implementation for generating such types of signals involves performing both a discrete Fourier transform (DFT) and an inverse discrete Fourier transform (IDFT) for a given stream or layer of symbols. There are several drawbacks of the frequency domain implementation of single carrier waveforms using DFT/IDFT. The complexity of DFT/IDFT implementation can vary depending on the symbol length. If the symbol length is other than a power of 2, the complexity increases as compared to a power of 2. Therefore, a signal with a length equal to a power of 2 is more desirable. As a result of being limited to powers of 2, there is a somewhat limited flexibility in symbol length. Also, because an IDFT must have a complete set of symbols available to correctly convert a signal back to the time domain, a transmitter implementing the DFT/IDFT waits until all of the symbols have been created in order to perform the IDFT and convert a signal back to the time domain. This delay of waiting for all the symbols to be created may lead to issues related to latency.

The time domain implementation provided herein has several advantages that may occur in some or all embodiments described in detail below. The time domain implementation allows for flexible symbol lengths without additional implementation complexity, e.g., the IDFT operation for prime values symbol lengths can be avoided.

In addition, in some embodiments the implementation complexity is lower with the use of a time domain localized pulse, thereby generally avoiding the need of a large IDFT mathematical operation.

Because samples are created sequentially in a time domain implementation, latency may also be reduced. The variable length of cyclic profixes (CPs) are also supported.

According to a first aspect of the disclosure, there is provided a method involving generating M Offset QAM (OQAM) symbols, M=2K, wherein K is a number of quadrature amplitude modulation (QAM) symbols and obtaining, in the time domain, a single carrier waveform based on M OQAM symbols. The obtaining the single carrier waveform includes upsampling the M OQAM symbols to generate N upsampled OQAM symbols and pulse shaping the N upsampled OQAM symbols by convolving the N upsampled OQAM symbols with a square root Nyquist pulse having a length equal to L.

In some embodiments, the method of further includes adding a cyclic prefix (CP) to the M OQAM symbols that is equal to a last $M_{CP}$ symbols of the M OQAM symbols; wherein upsampling the M OQAM symbols to generate N upsampled OQAM symbols includes upsampling the $M+M_{CP}$ OQAM symbols to generate $N+N_{CP}$ upsampled OQAM symbols; and wherein pulse shaping the N upsampled OQAM symbols includes pulse shaping the $N+N_{CP}$ upsampled OQAM symbols by convolving the $N+N_{CP}$ upsampled OQAM symbols with a square root Nyquist pulse having L sample points.

In some embodiments, the K symbols are QAM symbols, wherein the K QAM symbols are complex symbols including real and imaginary components.

In some embodiments, before the generating step, the method further includes performing pre-processing that includes generating M OQAM symbols by separating the K complex symbols into K symbols comprised of the K real components of the K complex symbols and another K symbols comprised of the K imaginary components of the K complex symbols, for a total of M=2K OQAM symbols.

In some embodiments, the method of further includes adding a cyclic prefix (CP) to the M OQAM symbols includes adding a last $M_{CP}$ symbols of the M OQAM symbols as the CP, wherein the $M_{CP}$ symbols are $2K_{CP}$ symbols.

In some embodiments, upsampling the M OQAM symbols to generate N upsampled OQAM symbols includes using an upsampling rate of $(N+N_{CP})/[2*(K+K_{CP})]$.

In some embodiments, the method of further includes, subsequent to pulse shaping, time domain windowing the $N+N_{CP}$ upsampled OQAM symbols, the time domain windowing including limiting a size of an output signal to a predetermined size.

In some embodiments, the time domain windowing includes controlling a number of CP symbols being added to achieve the predetermined size.

In some embodiments, the Nyquist pulse is conjugate symmetrical.

In some embodiments, the method of further includes receiving configuration information for generating the single carrier waveform in the time domain.

In some embodiments, the method of further includes transmitting the generated single carrier waveform.

According to a second aspect of the disclosure, there is provided a method involving: receiving a signal including N upsampled offset OQAM; match filtering the received signal by using a combined version of an impulse response of a communication channel and a square root Nyquist pulse that is complementary to a square root Nyquist pulse used for pulse shaping at a transmitter; and down-sampling the N upsampled OQAM symbols to generate 2K OQAM symbols.

In some embodiments, the method further includes, when the received signal has a cyclic prefix (CP) and the received signal has $N+N_{CP}$ upsampled OQAM symbols: match filtering the N upsampled OQAM symbols includes match filtering the $N+N_{CP}$ upsampled OQAM symbols; down-sampling the N upsampled OQAM symbols to generate 2K OQAM symbols includes down-sampling the $N+N_{CP}$ upsampled OQAM symbols to generate $2(K+K_{CP})$ OQAM symbols; and removing the CP from an end of the $2(K+K_{CP})$ OQAM symbols resulting in 2K OQAM symbols.

In some embodiments, subsequent to down-sampling, performing processing that includes generating K QAM symbols by combining K OQAM symbols of the 2K OQAM symbols as real components of the K QAM symbols and remaining K OQAM symbols of the 2K OQAM symbols as imaginary components of the K QAM symbols.

In some embodiments, the method further includes, prior to removing the CP, performing time domain equalization.

In some embodiments, the method further includes, subsequent to removing the CP, performing: a 2K point discrete Fourier transform (DFT); frequency domain equalization; and a 2K point inverse discrete Fourier transform (IDFT).

In some embodiments, the method further includes, receiving configuration information for receiving and decoding a single carrier waveform in the time domain.

According to a third aspect of the disclosure, there is provided a device including a processor and a computer-readable medium having stored thereon computer executable instructions. When executed by the processor, the computer executable instructions cause the device to: generate M Offset QAM (OQAM) symbols, M=2K, wherein K is a number of quadrature amplitude modulation (QAM) symbols; obtain, in the time domain, a single carrier waveform based on M OQAM symbols by: upsampling the M OQAM symbols to generate N upsampled OQAM symbols; and pulse shaping the N upsampled OQAM symbols by convolving the N upsampled OQAM symbols with a square root Nyquist pulse having a length equal to L.

In some embodiments, the computer executable instructions further cause the device to: add a cyclic prefix (CP) to the M OQAM symbols that is equal to a last $M_{CP}$ symbols of the M OQAM symbols; wherein upsampling the M OQAM symbols to generate N upsampled OQAM symbols includes upsampling the $M+M_{CP}$ OQAM symbols to generate $N+N_{CP}$ upsampled OQAM symbols; and wherein pulse shaping the N upsampled OQAM symbols includes pulse shaping the $N+N_{CP}$ upsampled OQAM symbols by convolving the $N+N_{CP}$ upsampled OQAM symbols with a square root Nyquist pulse having L sample points.

In some embodiments, wherein the K symbols are QAM symbols, wherein the K QAM symbols are complex symbols including real and imaginary components.

In some embodiments, the computer executable instructions further cause the device to, before the generate step, generate M OQAM symbols by separating the K complex symbols into K symbols comprised of the K real components of the K complex symbols and another K symbols comprised of the K imaginary components of the K complex symbols, for a total of M=2K OQAM symbols.

In some embodiments, the computer executable instruction further cause the device to: add a cyclic prefix (CP) to the M OQAM symbols that includes adding a last $M_{CP}$ symbols of the M OQAM symbols as the CP, wherein the $M_{CP}$ symbols are $2K_{CP}$ symbols.

In some embodiments, the upsampling the M OQAM symbols to generate N upsampled OQAM symbols includes using an upsampling rate of $(N+N_{CP})/[2*(K+K_{CP})]$.

According to a fourth aspect of the disclosure, there is provided a device including a processor and a computer-readable medium having stored thereon computer executable instructions. When executed by the processor, the computer executable instructions cause the device: receive a signal including N upsampled offset OQAM; match filter the received signal by using a combined version of an impulse response of a communication channel and a square root Nyquist pulse that is complementary to a square root Nyquist pulse used for pulse shaping at a transmitter; down-sample the N upsampled OQAM symbols to generate 2K OQAM symbols; and generate K QAM symbols from the 2K OQAM symbols.

In some embodiments, the computer executable instructions further cause the device to, when the received signal has a cyclic prefix (CP) and the received signal has $N+N_{CP}$ upsampled OQAM symbols: match filter the N upsampled OQAM symbols includes match filtering the $N+N_{CP}$ upsampled OQAM symbols; down-sample the N upsampled OQAM symbols to generate 2K OQAM symbols includes down-sampling the $N+N_{CP}$ upsampled OQAM symbols to generate $2(K+K_{CP})$ OQAM symbols; and prior to generating the K QAM symbols, remove the CP from an end of the $2(K+K_{CP})$ OQAM symbols resulting in 2K OQAM symbols.

In some embodiments, the computer executable instructions cause the device to generate the K QAM symbols include computer executable instructions to cause the device to combine K OQAM symbols of the 2K OQAM symbols as real components of the K QAM symbols and remaining K OQAM symbols of the 2K OQAM symbols as imaginary components of the K QAM symbols.

In some embodiments, the computer executable instructions further cause the device to, prior to removing the CP, perform time domain equalization.

In some embodiments, the computer executable instructions further cause the device to, subsequent to removing the CP, perform: a 2K point discrete Fourier transform (DFT); frequency domain equalization; and a 2K point inverse discrete Fourier transform (IDFT).

In some embodiments, the computer executable instructions further cause the device to receive configuration information for receiving and decoding a single carrier waveform in the time domain.

According to a fifth aspect of the disclosure, there is provided a method including: obtaining, in the time domain, a single carrier waveform based on M quadrature amplitude modulation (QAM) symbols. The obtaining the single carrier waveform includes adding a cyclic prefix (CP) to the M QAM symbols equal to a number $M_{CP}$ of the QAM symbols; upsampling the $M+M_{CP}$ QAM symbols to generate $N+N_{CP}$ upsampled QAM symbols; and pulse shaping the $N+N_{CP}$ upsampled QAM symbols by convolving the $N+N_{CP}$ upsampled QAM symbols with a square root Nyquist pulse having a length equal to L.

In some embodiments, the adding a cyclic prefix (CP) to the M QAM symbols includes adding a last $M_{CP}$ symbols of the M QAM symbols to the beginning of the M QAM symbols resulting in the $M+M_{CP}$ QAM symbols.

In some embodiments, the upsampling the M QAM symbols to generate the $N+N_{CP}$ upsampled QAM symbols includes using an upsampling rate of $(N+N_{CP})/(M+M_{CP})$.

In some embodiments, the method further includes, subsequent to pulse shaping, time domain windowing the $N+N_{CP}$ upsampled QAM symbols, the time domain windowing including limiting a size of an output signal to a predetermined size.

In some embodiments, the time domain windowing includes controlling a number of CP symbols being added to achieve the predetermined size.

In some embodiments, the method further includes receiving configuration information for generating the single carrier waveform in the time domain.

In some embodiments, the method further includes transmitting the generated single carrier waveform.

According to a sixth aspect of the disclosure, there is provided a method that includes a receiving a signal including $N+N_{CP}$ upsampled quadrature amplitude modulation (QAM) symbols; match filtering the received signal by using a combined version of an impulse response of a communication channel and a square root Nyquist pulse that is complementary to a square root Nyquist pulse used for pulse shaping at a transmitter; down-sampling the $N+N_{CP}$ upsampled QAM symbols to generate $K+K_{CP}$ QAM symbols; and removing the CP from an end of the $K+K_{CP}$ QAM symbols resulting in K QAM symbols.

In some embodiments, the method further includes prior to removing the CP, performing time domain equalization.

In some embodiments, the method further includes subsequent to removing the CP, performing: a K point discrete Fourier transform (DFT); frequency domain equalization; and a K point inverse discrete Fourier transform (IDFT).

In some embodiments, the method further includes receiving configuration information for receiving and decoding a single carrier waveform in the time domain.

According to a seventh aspect of the disclosure, there is provided a device including a processor and a computer-readable medium having stored thereon computer executable instructions. When executed by the processor, the computer executable instructions cause the device to: obtain, in the time domain, a single carrier waveform based on M quadrature amplitude modulation (QAM) symbols. The obtaining the single carrier waveform includes adding a cyclic prefix (CP) to the M QAM symbols equal to a number $M_{CP}$ of the QAM symbols; upsampling the $M+M_{CP}$ QAM symbols to generate $N+N_{CP}$ upsampled QAM symbols; and pulse shaping the $N+N_{CP}$ upsampled QAM symbols by convolving the $N+N_{CP}$ upsampled QAM symbols with a square root Nyquist pulse having a length equal to L.

In some embodiments, the adding a cyclic prefix (CP) to the M QAM symbols includes adding a last $M_{CP}$ symbols of the M QAM symbols to the beginning of the M QAM symbols resulting in the $M+M_{CP}$ QAM symbols.

In some embodiments, the upsampling the M QAM symbols to generate the $N+N_{CP}$ upsampled QAM symbols includes using an upsampling rate of $(N+N_{CP})/(M+M_{CP})$.

In some embodiments, the computer executable instructions further cause the device to, subsequent to pulse shaping, time domain window the $N+N_{CP}$ upsampled QAM symbols, the time domain windowing including limiting a size of an output signal to a predetermined size.

In some embodiments, the time domain windowing includes controlling a number of CP symbols being added to achieve the predetermined size.

In some embodiments, the computer executable instructions further cause the device to receive configuration information for generating the single carrier waveform in the time domain.

In some embodiments, the computer executable instructions further cause the device to transmit the generated single carrier waveform.

According to a eighth aspect of the disclosure, there is provided a device including a processor and a computer-readable medium having stored thereon computer executable instructions. When executed by the processor, the computer executable instructions cause the device to: receive a signal including $N+N_{CP}$ upsampled quadrature amplitude modulation (QAM) symbols; match filtering the received signal by using a combined version of an impulse response of a communication channel and a square root Nyquist pulse that is complementary to a square root Nyquist pulse used for pulse shaping at a transmitter; down-sampling the $N+N_{CP}$ upsampled QAM symbols to generate $K+K_{CP}$ QAM symbols; and removing the CP from an end of the $K+K_{CP}$ QAM symbols resulting in K QAM symbols.

In some embodiments, the computer executable instructions further cause the device to, prior to removing the CP, perform time domain equalization.

In some embodiments, the computer executable instructions further cause the device to, subsequent to removing the CP, perform: a K point discrete Fourier transform (DFT); frequency domain equalization; and a K point inverse discrete Fourier transform (IDFT).

In some embodiments, the computer executable instructions further cause the device to receive configuration information for receiving and decoding a single carrier waveform in the time domain.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
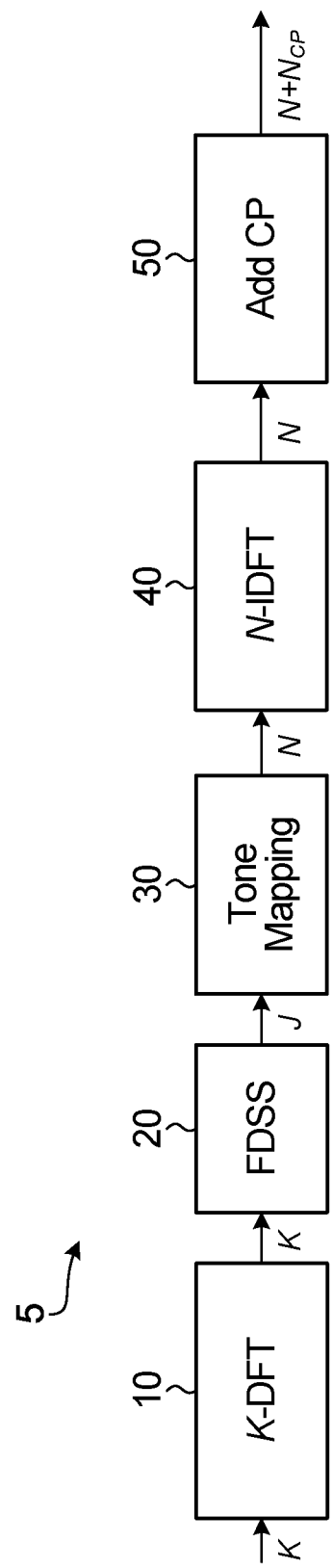
FIG. 1 is a block diagram of a single carrier quadrature amplitude modulation (QAM) transmitter implemented in the frequency domain.

As indicated above, DFT-s-OFDM and single carrier OQAM are conventionally implemented in the frequency domain. Frequency domain implementation involves performing both a discrete Fourier transform (DFT) and an inverse discrete Fourier transform (IDFT) for a given stream or layer of symbols. FIG. 1 shows an example of a processing path 5 for a frequency domain implementation. K symbols are provided to a K-point DFT processing block 10 that coverts a time domain signal into a frequency domain signal. A frequency domain representation of the K symbol output of the K-DFT processing block 10 is provided to a frequency domain spectrum shaping (FDSS) block 20. The FDSS block 20 converts the frequency domain representation of the K symbols into a frequency domain representation of J symbols. The J symbol output of the FDSS block 20 is provided to a tone mapping block 30 that maps the J symbols in the frequency domain and in the process converts the frequency domain representation of the J symbols into a frequency domain representation of N symbols. An N symbol output of the tone mapping block 30 is provided to a N-point IDFT processing block 40 that converts the frequency domain N symbols to a time domain representation of the N symbols. The N symbol output of the N-point IDFT processing block 40 is provided to a processing block 50 that adds a cyclic prefix (CP) resulting a $N+N_{CP}$ symbols.

Implementation of DFT/IDFT can be relatively easily performed when the length of the set of K symbols and N symbols are each a power of 2. In 3GPP standards, the symbol length N is fixed at powers of 2, for example $2^7$, $2^{10}$, or other powers of 2. Because the relative ease of implementation, frequency domain implementations are the conventional implementation used for DFT-s-OFDM.

However, there are several drawbacks of frequency domain implementation of single carrier waveforms using DFT/IDFT. The complexity of DFT/IDFT implementation can vary depending on the symbol length. If the symbol length is other than a power of 2, the complexity increases as compared to a power of 2. Therefore, a signal with a length equal to a power of 2 is more desirable. As a result of being limited to powers of 2, there is a somewhat limited flexibility in symbol length.

Because an IDFT must have a complete set of symbols available to correctly convert a signal back to the time domain, a transmitter implementing the DFT/IDFT waits until all of the symbols have been created in order to perform the IDFT and convert a signal back to the time domain. This delay of waiting for all the symbols to be created may lead to issues related to latency.

In the frequency domain implementation CP is added after creating the up-sampled signal, as can be seen by the Add CP block 50 being at the end of the transmitter chain in FIG. 1. This limits flexibility of different CP lengths in current frame structures governed by 3GPP standards.

As implementation in the frequency domain is substantially equivalent to a circular convolution of an up-sampled data signal with a Nyquist pulse, or function thereof, such as a square root Nyquist pulse, in the time domain, there are alternatives to performing a frequency domain implementation.

Aspects of the present disclosure propose time domain implementation of a single carrier waveform. Aspects of the present disclosure can be used for both single carrier QAM DFT-s-OFDM and single carrier OQAM, or similar other single carrier waveforms. A time domain implementation allows flexible symbol lengths without additional complexity. Therefore, an IDFT operation for prime value lengths can be avoided. Aspects of the disclosure can be adaptable for a range of signal lengths providing greater flexibility. In some instances, implementation complexity is lower with the use of a time domain localized pulse and therefore use of a large IDFT operation is not required. Further, signal samples are created sequentially, as opposed to having to have all the samples before the IDFT is performed as required in the frequency domain implementation. A further result of a time domain implementation is that latency may be reduced by transmitting samples as they are generated. In a time domain implementation CP is added prior to signal generation as opposed to after signal generation in a frequency domain implementation. Therefore, a time domain implementation supports variable CP lengths.

Figure 2:
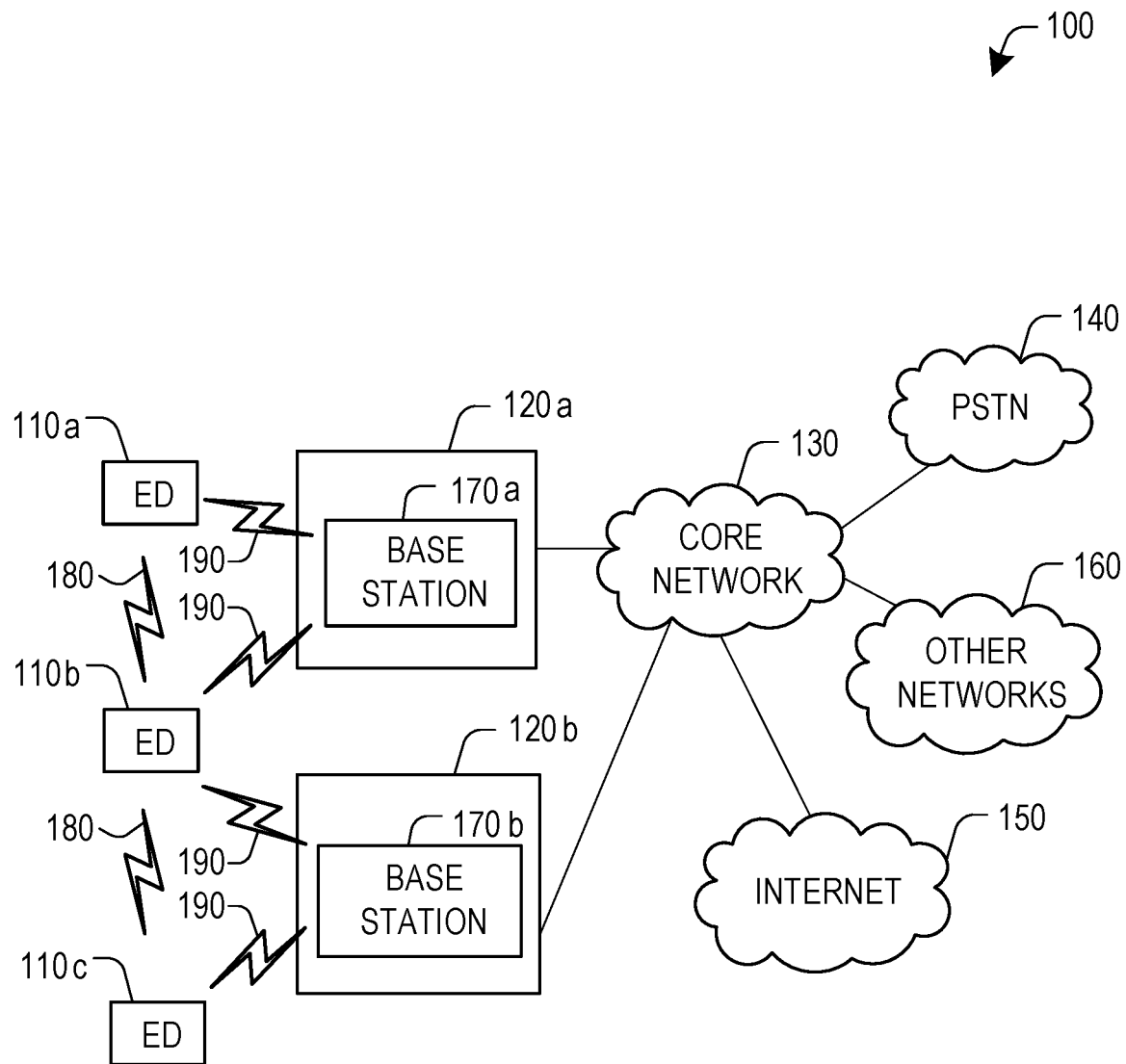
FIG. 2 is a schematic diagram of a communication system in which embodiments of the disclosure may occur.
Figure 3A:
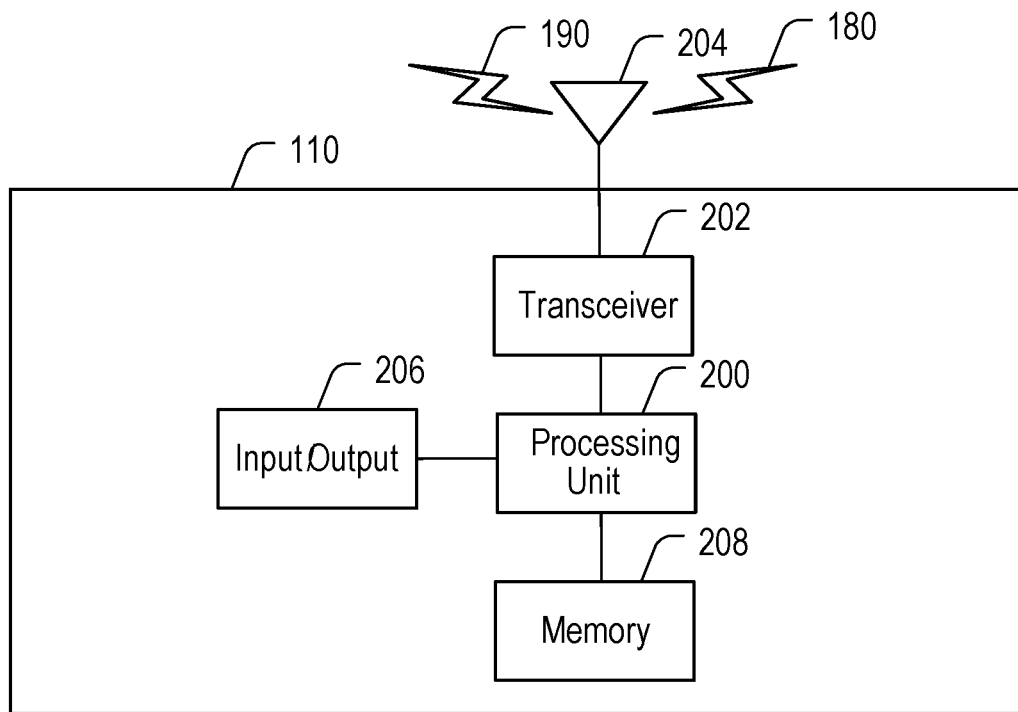
FIGS. 3A and 3B are block diagrams of an example user equipment and base station, respectively, in which embodiments of the disclosure may occur.
Figure 3B:
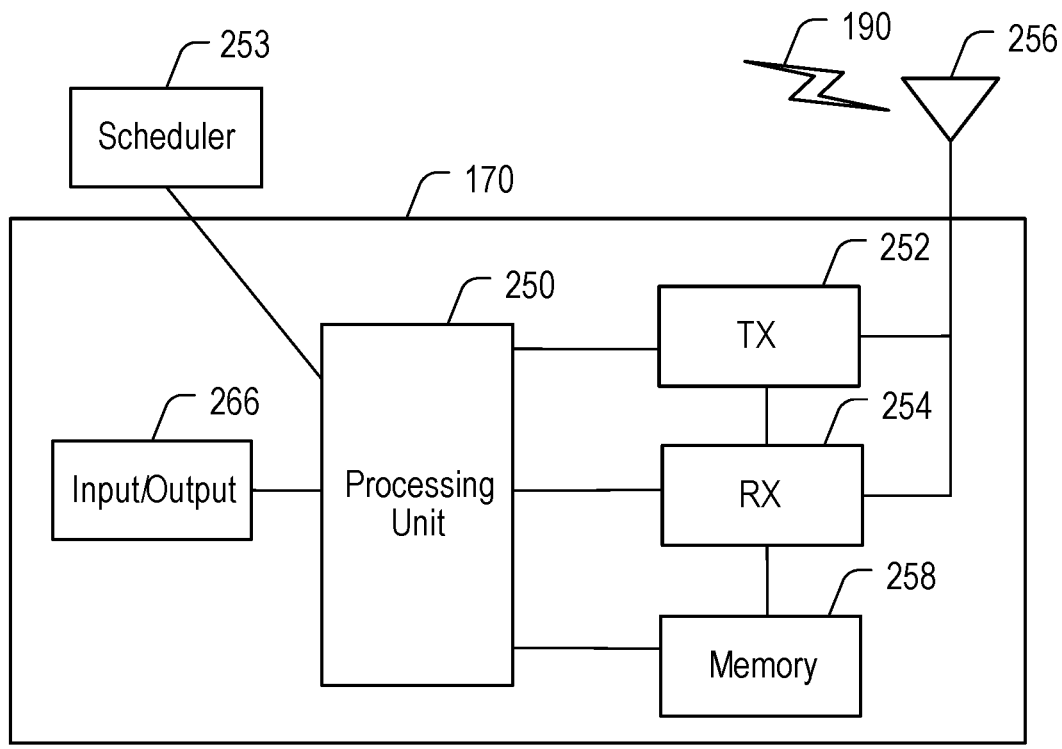

FIGS. 2, 3A, and 3B following below provide context for the network and devices that may be in the network and that may implement aspects of the present disclosure.

FIG. 2 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 2, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 2 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 2, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 2, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 2, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more side link (SL) air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

FIGS. 3A and 3B illustrate example devices that may implement the methods and teachings according to this disclosure. In particular, FIG. 3A illustrates an example ED 110, and FIG. 3B illustrates an example base station 170. These components could be used in the system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the UEs 110 and the base stations 170 are known to those of skill in the art. As such, these details are omitted here for clarity.

Figure 4:
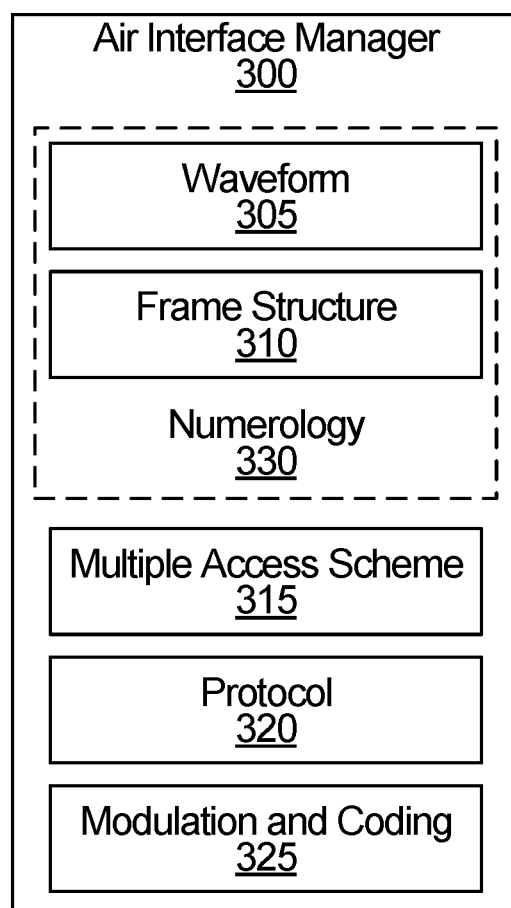
FIG. 4 is a block diagram of an air interface manager for configuring a software-configurable air interface according to an aspect of the present disclosure.

FIG. 4 illustrates a schematic diagram of an air interface manager 300 for configuring a software-configurable air interface 190. The air interface manager 300 may be, for example, a module including a number of components or building blocks that define the parameters of the air interface 190 and collectively specify how a transmission is to be made and/or received by the air interface 190. The air interface manger 300 could also or instead define the parameters of the SL air interface 180 and collectively specify how a transmission is to be made and/or received by the SL air interface 180.

The components of the air interface manger 300 include at least one of a waveform component 305, a frame structure component 310, a multiple access scheme component 315, a protocol component 320, and a modulation and coding component 325.

The waveform component 305 may specify a shape and form of a signal being transmitted. Waveform options may include orthogonal multiple access waveforms and non-orthogonal multiple access waveforms. Non-limiting examples of such waveform options include Single-Carrier (SC), Ultra-Wideband (UWB), Frequency Modulated Continuous Wave (FMCW), Linear Frequency Modulated (LFM), Orthogonal Frequency Division Multiplexing (OFDM), Single-Carrier Frequency Division Multiple Access (SC-FDMA), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, low Peak to Average Power Ratio Waveform (low PAPR WF), Discrete Fourier Transform-spread-Orthogonal Frequency Domain Modulation (DFT-s-OFDM) and single carrier Offset Quadrature Amplitude Modulation (OQAM). In some embodiments, a combination of waveform options is possible.

The frame structure component 310 may specify a configuration of a frame or group of frames. The frame structure component 310 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval, TTI, or a transmission time unit, TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as subcarrier spacing width, symbol duration, cyclic prefix (CP) length, channel bandwidth, guard bands/subcarriers, and sampling size and frequency.

Additionally, the frame structure component 310 may further specify whether the frame structure is used in a time-division duplex communication or a frequency-division duplex communication.

Additionally, the frame structure component 310 may further specify the transmission state and/or direction for each symbol in a frame. For example, each symbol may independently be configured as a downlink symbol, an uplink symbol, or a flexible symbol.

Together, the specifications of the waveform component and the frame structure component are sometimes known as the "numerology." Thus, the air interface 190 may include a numerology component 330 defining a number of air interface configuration parameters, such as the sub-carrier spacing, CP length, symbol length, slot length, and symbols per slot.

These numerologies, also known as subcarrier spacing configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing may be compatible with LTE. A numerology with 15 kHz subcarrier spacing may serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths. In addition, subcarrier spacing may depend on the operational frequency band. For example, the subcarrier spacing in millimeter wave frequencies may be higher than in lower frequencies.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs).

The use of different numerologies can allow the air interface 190 to support coexistence of a diverse set of use cases having a wide range of quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 315 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Space Division Multiple Access (SDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free access or configured grant, contention-based shared channel resource, non-contention-based shared channel resource, and cognitive radio-based access.

The protocol component 320 may specify how a transmission and/or a re-transmission are to be made. Non-limiting examples of transmission and/or re-transmission mechanism options include those that specify a scheduled data pipe size and a signaling mechanism for transmission and/or re-transmission.

The modulation and coding component 325 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to Quadrature Amplitude Modulation (QAM) specified by a complex constellation (including, for example, the modulation technique and order, e.g. 16QAM, 64QAM, 256QAM etc.), or more specifically to various types of advanced modulation methods such as hierarchical modulation, multi-dimensional modulation and low Peak-to-Average Power Ratio (PAPR) modulation.

Because an air interface includes a plurality of components or building blocks, and each component may have a plurality of candidate technologies (also referred to herein as air interface capability options), the air interface manager 300 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 300 and used for communications between the pair of communicating transmitting-receiving devices.

In further embodiments, the air interface manager 300 may modify or update its components, profiles, or capability options. For example, the air interface manager 300 may replace the waveform and frame structure components 305, 310, with a single numerology component 330. Conversely, the air interface manager 300 may separate the modulation and coding component 325 into an individual coding component and an individual modulation component. Furthermore, the air interface manager 300 is configurable such that new soft air interface configuration components developed in the future should be able to be utilized.

The air interface manager 300 may also update certain components to modify the capability options of any given component. For example, the air interface manager 300 may update the modulation and coding component 325 to include higher-order modulation schemes.

By updating the stored components, profiles, and candidate options, the air interface manager 300 can flexibly adapt to better accommodate diverse wireless traffic types and services. Modifying or updating components, profiles, and candidate options may allow the air interface manager 300 to provide suitable air interface profiles for traffic types or services other than those already contemplated for ultra-reliable low latency communications (URLLC), enhanced mobile broadband (eMBB), and massive machine-type communications (mMTC).

Figure 8A:
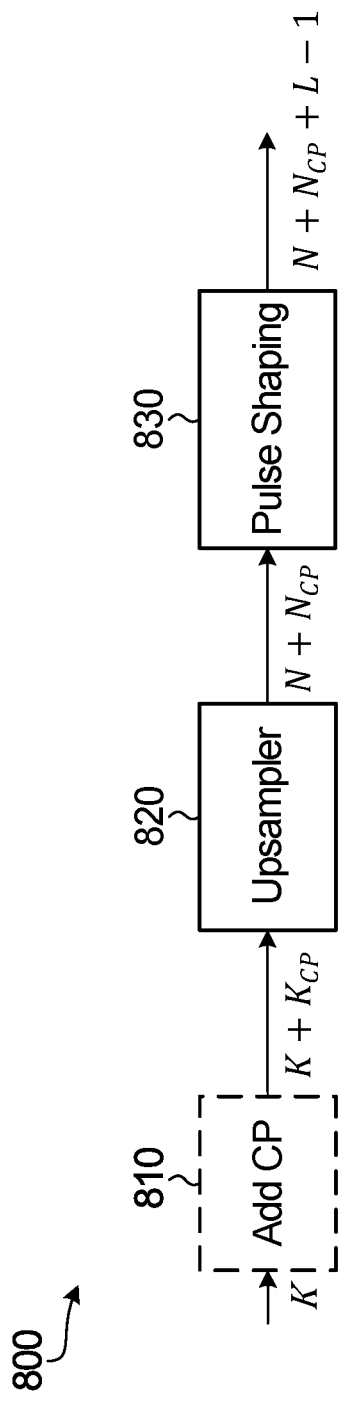
FIG. 8A illustrates a block diagram of a single carrier discrete Fourier transform-spread-orthogonal frequency division multiplexed (DFT-s-OFDM) QAM transmitter implemented in the time domain according to an embodiment of the present disclosure.
Figure 8B:
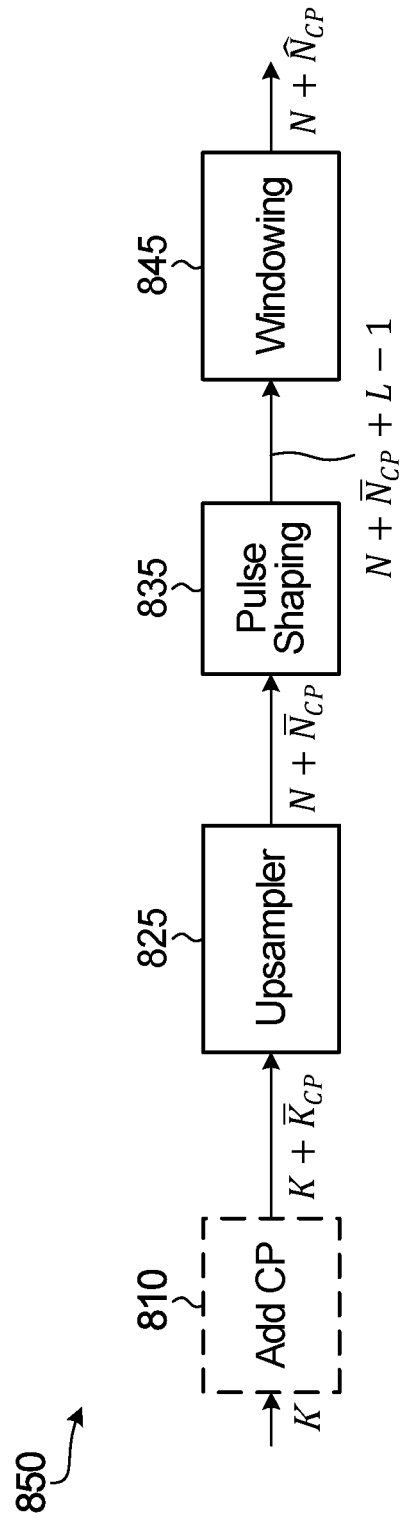
FIG. 8B illustrates a block diagram of a single carrier DFT-s-OFDM QAM transmitter implemented in the time domain with a windowing operation according to an embodiment of the present disclosure.

Generalized examples of a QAM transmitter are described below with regard to FIGS. 5A and 5B. FIGS. 6A and 6B then apply the generalized examples to particular examples of a QAM transmitter for use with offset QAM (OQAM) and FIGS. 8A and 8B provide particular examples of a QAM transmitter for use with DFT-s-OFDM.

Figure 5A:
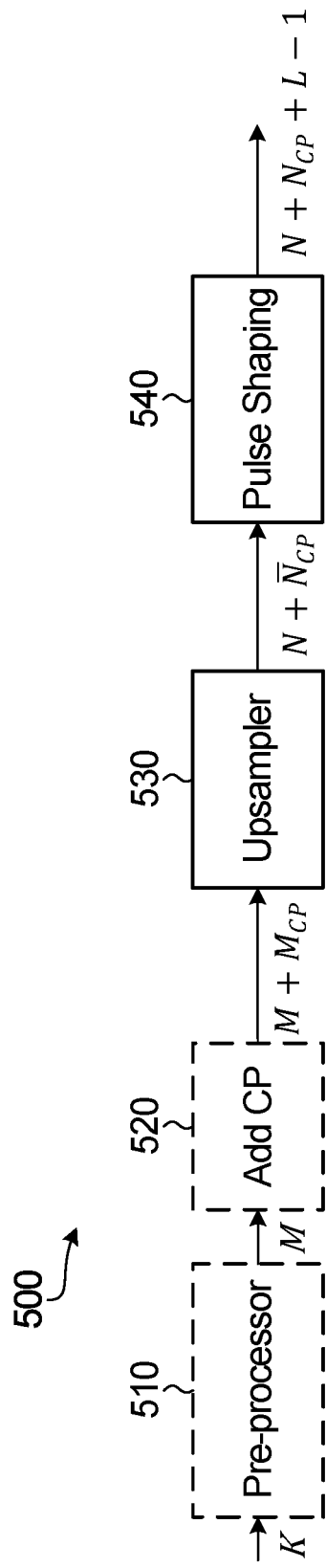
FIG. 5A illustrates a block diagram of a single carrier QAM transmitter implemented in the time domain according to an embodiment of the present disclosure.
Figure 6A:
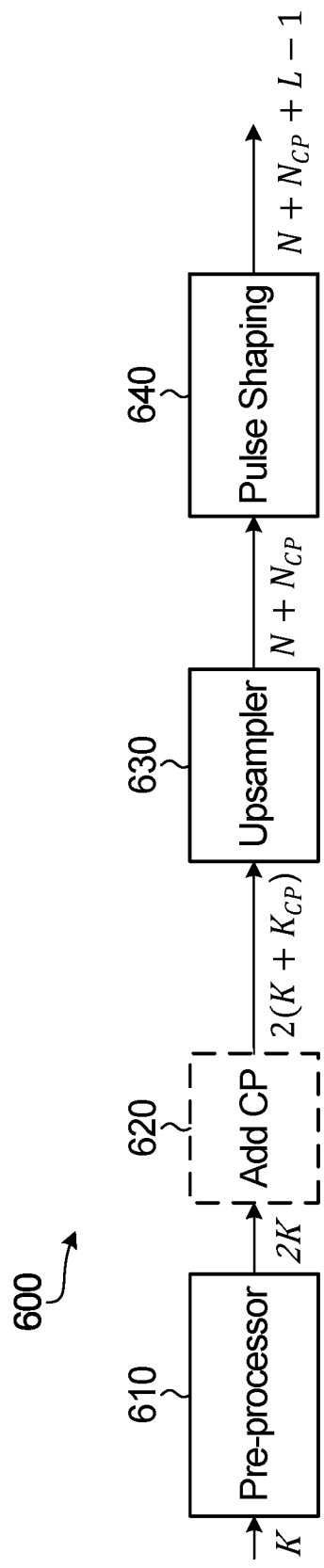
FIG. 6A illustrates a block diagram of a single carrier Offset QAM (OQAM) transmitter implemented in the time domain according to an embodiment of the present disclosure.
Figure 6B:
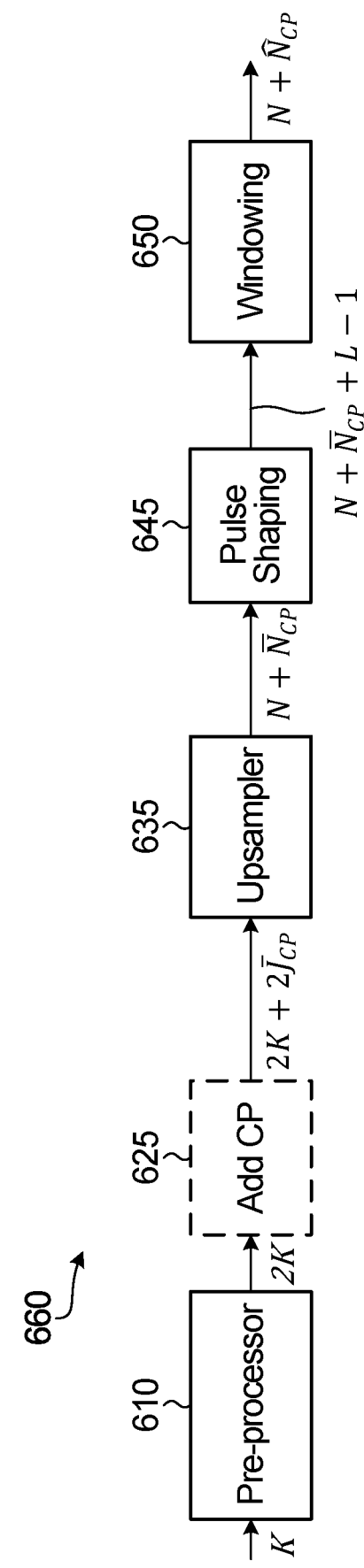
FIG. 6B illustrates a block diagram of a single carrier OQAM transmitter implemented in the time domain with a windowing operation according to an embodiment of the present disclosure.

FIG. 5A is a block diagram showing an example of a time domain implementation for single carrier QAM transmitter 500. An input to the single carrier QAM transmitter 500 is a sequence of K QAM symbols. The order K of the QAM symbol can be any value. QAM constellations include K constellation points are often arranged in a square grid, where K can be equal to 4, 16, 64 and 256, or other values that may be used for future networks. However, embodiments described herein can be used for any order K.

A first element shown in FIG. 5A is an optional pre-processor 510. The pre-processor 510 generates an M symbol sequence from the K QAM symbol sequence, wherein M≥K. FIGS. 6A and 6B below describe particular examples of a pre-processor that may be included in an OQAM transmitter.

In some embodiments, an output of the pre-processor 510 is then provided to a block 520 (for example, Add CP) that adds a cyclic prefix (CP) to the sequence of M symbols. As a result, the M symbols become M+$M_{CP}$ symbols. It should be noted here that the CP being added is an integer number of symbols, not a particular number of samples as in the frequency domain implementation. For an example, the Add CP block 520 repeats the last $M_{CP}$ symbols of the M symbol sequence at the beginning of the sequence for a total of M+$M_{CP}$ symbols. The Add CP block 520 is also an optional processing block and may be used in some embodiments, such as when there is frequency domain equalization (FDE) at the receiver end of a communication link.

When there is no pre-processor 510, the input of K QAM symbols may be input directly to the Add CP block 520 and in such a case M=K for the sake of the symbols enumerated in FIG. 5A.

An output of the Add CP block 520 is provided to an upsampler 530. An upsampler, such as upsampler 530 converts a number of data points to a larger number of data points. Having a larger number of data points enables a signal to have a higher resolution. The upsampler 530 upsamples the M+$M_{CP}$ symbols and generates N+$N_{CP}$ upsampled symbols in the process. The upsampling rate to generate the N+$N_{CP}$ upsampled symbols is (N+$N_{CP}$)/(M+$M_{CP}$). If there is a pre-processor 510, but no Add CP block 520, the M symbols are added to the upsampler 530, which upsamples the M symbols and generates N upsampled symbols in the process.

An output of upsampler 530 is provided to pulse shaping block 540. The pulse shaping block 540 performs a linear convolution with a square root Nyquist pulse with length L to create an output signal. An example of a square root Nyquist pulse type that is a conjugate symmetrical pulse is a root raised cosine pulse.

Figure 5B:
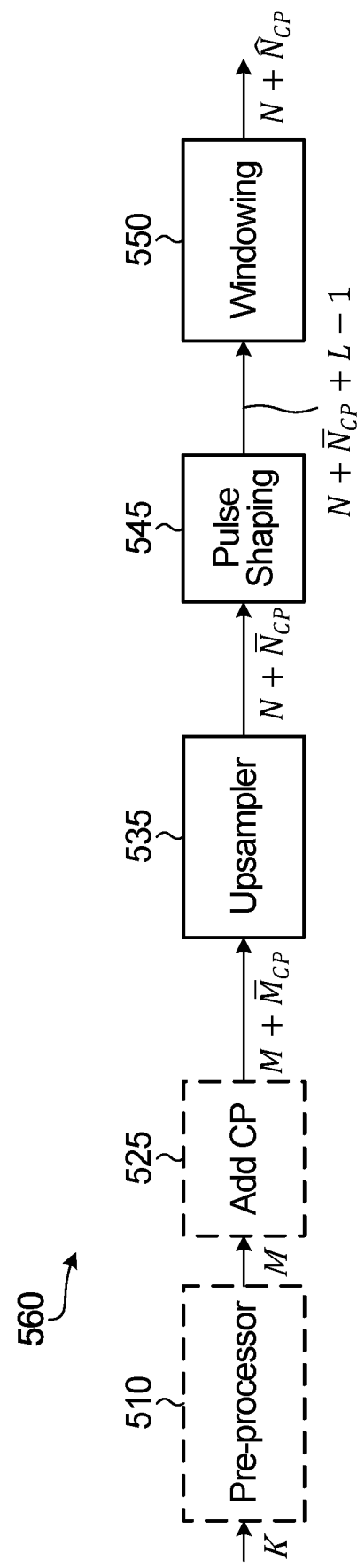
FIG. 5B illustrates a block diagram of a single carrier QAM transmitter implemented in the time domain with a windowing operation according to an embodiment of the present disclosure.

FIG. 5B is a block diagram showing a generalized example of a time domain implementation for single carrier QAM transmitter 560 with the addition of a windowing QAM transmitter 560 includes an optional pre-processor 510, optional Add CP block 525, upsampler 535 and pulse shaping block 545, which are similar to the elements in single carrier QAM transmitter 500 in FIG. 5A. The windowing block 550 can be useful in correcting CP irregularities. In the Add CP block 525, $\overline{M}_{CP}$ symbols are added as CP. Subsequently, the upsampled symbol length is N+$\overline{N}_{CP}$ and pulse shaped symbol length is N+$\overline{N}_{CP}$ L−1. The N+$\overline{N}_{CP}$ length time domain window is used to limit the output signal length to be N+$\hat{N}_{CP}$. $\hat{N}_{CP}$ can be adjusted to match any desired CP length.

The transmitter described with regard to FIGS. 5A and 5B, and those described below with regard to FIGS. 6A 6B, 8A and 8B, may be part of any type of device that is used to transmit to a receiving device. For example, the transmitter may be part of a base station, access point or relay that is transmitting to another device in a network. Examples of other devices that the transmitter may transmit to include a UE or a relay that then transmits to a UE. The transmitter may be part of a UE that is transmitting to a base station, access point relay station or another UE. The network may provide configuration information to the transmitter, whether the transmitter is a base station or UE, pertaining to information the transmitter needs to know to operate properly. In some implementations, the transmitter makes its own selections of some or all of the parameters without being configured by the network. In some implementations, the transmitter may be configured based on a combination of information received by the network and selections made by the transmitter. Additional description regarding configuration information will be provided below.

FIG. 6A is a block diagram showing an example of a time domain implementation for single carrier OQAM transmitter 600. An input of K QAM symbols is provided to a pre-processor 610 that generates a 2K length OQAM symbol sequence by separating the K complex QAM symbols into respective K real and K imaginary components. For example, where each QAM symbol is represented as $a_i$+$ib_i$, i=1 to K, and a sequence of K QAM symbols is $a_1$+$ib_1$, $a_2$+$ib_2$, . . . , $a_K$+$ib_K$, a 2K OQAM output of the pre-processor 610 would be equivalent to $a_1$, $ib_1$, $a_2$, $ib_2$, . . . , $a_K$, $ib_K$.

In some embodiments, an output of the pre-processor 610 is then provided to an optional block 620 (for example Add CP) that adds CP to the sequence of OQAM symbols. The Add CP block 610 repeats the last 2$K_{CP}$ OQAM symbols at the beginning of the 2K length OQAM symbol sequence. As a result, the 2K OQAM symbols become 2(K+$K_{CP}$) OQAM symbols. It should be noted here that the CP being added is an integer number of OQAM symbols, not a particular number of samples as in the frequency domain implementation. As in the generalized version of FIGS. 5A and 5B, the Add CP block 620 may be used when there is frequency domain equalization (FDE) at the receiver end of a communication link.

An output of the Add CP block 620 is provided to an upsampler 630. The upsampler 630 upsamples the 2(K+$K_{CP}$) OQAM symbols and generates N+$N_{CP}$ upsampled OQAM symbols in the process. The upsampling rate to generate the N+$N_{CP}$ upsampled OQAM symbols is (N+$N_{CP}$)/[2(K+$K_{CP}$)]. If there is no Add CP block 620, the 2K OQAM symbols are added to the upsampler 630, which upsamples the 2K OQAM symbols and generates N upsampled OQAM symbols in the process.

An output of upsampler 630 is provided to pulse shaping block 640. The pulse shaping block 640 performs a linear convolution with a square root Nyquist pulse with length L to create an output signal. In some embodiments, the square root Nyquist pulse is a conjugate symmetrical pulse. The frequency response of the square root Nyquist pulse length may have a J non-zero components, wherein $K \leq J \leq 2K-1$. Such a length J is odd (as opposed to even) and real. A root raised cosine pulse is an example of an odd and read sequence. Non-zero component lengths of $J > 2K-1$ are also possible.

FIG. 6B is a block diagram showing an example of a time domain implementation for single carrier OQAM transmitter 660 with the addition of a windowing block 650. The single carrier OQAM transmitter 660 includes pre-processor 615, optional Add CP block 625, upsampler 635 and pulse shaping block 645 of similar type to those in single carrier OQAM transmitter 600 in FIG. 6A. Subsequently, the upsampled length is $N+\bar{N}_{CP}$ and pulse shaped length is $N+\bar{N}_{CP}+L-1$. The $N+\hat{N}_{CP}$ length time domain window is used to limit the output signal length to be $N+\hat{N}_{CP}$. $\hat{N}_{CP}$ can be adjusted to match any desired CP length.

If $\hat{N}_{CP}$ is set equal to $N_{CP}+L-1$, then the output length equal is equal to the output length in non-windowing scheme in FIG. 6A.

Figure 7:
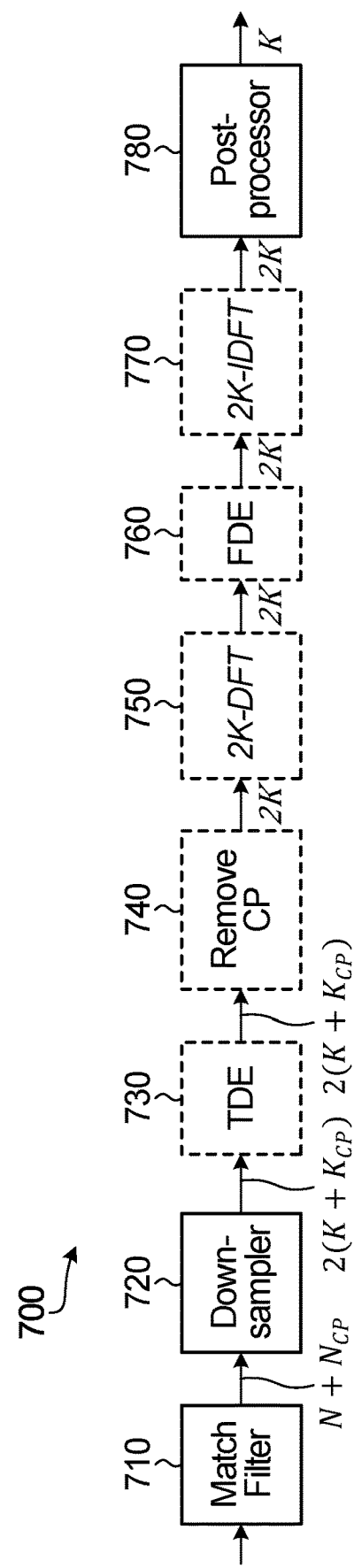
FIG. 7 illustrates a block diagram of a single carrier OQAM receiver implemented in the time domain according to an embodiment of the present disclosure.

FIG. 7 is a block diagram showing an example of a time domain implementation for single carrier OQAM receiver 700 that may be complementary to the transmitters in FIGS. 6A and 6B. A received signal that has a CP as part of the signal is provided to a match filter 710 and produces a sequence of $N+N_{CP}$ upsampled OQAM symbols. The match filter 710 uses the combined impulse response of the channel and the pulse to perform the filtering. A same type of pulse used in the pulse shaping block at a transmitter that is transmitting the signal to the receiver 700. In some embodiments, a different square root Nyquist conjugate symmetrical pulse can be used when the receiver does not have knowledge of the pulse shape used at the transmitter.

The output of $N+N_{CP}$ upsampled OQAM symbols from the match filter 710 is down-sampled by a down-sampler 720. A down-sampler, such as down-sampler 720 converts a number of data points to a smaller number of data points. The down-sampler is converting this signal to a number of data points similar to that before it was upsampled at the transmitter. In some embodiments, a down-sampling rate is $2(K+K_{CP})/(N+N_{CP})$, which results in $2(K+K_{CP})$ OQAM symbols in the sequence.

There are several optional processing blocks that may occur subsequent to the down-sampler 720. FIG. 7 illustrates three particular optional features that may be in the receiver, time domain equalization (TDE), CP removal, and frequency domain equalization (FDE). Some embodiments have only one feature, some embodiments have two of the features and some embodiments may have all three features.

FIG. 7 illustrates an output of the down-sampler 720 being provided to a TDE block 730. The TDE block 730 performs equalization of a time domain received signal. There are several ways to perform this equalization such as zero forcing (ZF), minimum mean square error (MMSE). After equalization, an estimate of the transmitted signal is obtained. TDE may be used for channel shortening, which reduces the number of channel taps to a desired level. If TDE is used for channel shortening, then frequency domain equalization (FDE) may be present to perform the equalization.

If there was an Add CP processing block in a transmitter that is transmitting the signal to the receiver 700, the receiver 700 should include a Remove CP processing block, such as Remove CP processing block 740. The Remove CP processing block 740 may receive a signal from the TDE block 730, if there is a TDE block. If there is no CP in the signal, there is no need for a remove CP block 740, and there would be no additional $N_{CP}$ or $K_{CP}$ component output from the match filter 710, down-sampler 720 and TDE block 730, if a TDE block 730 is part of the receiver 700.

The receiver 700 may include a FDE block 760 together with both a DFT block 750 preceding the FDE block 760 and an IDFT block 770 subsequent to the FDE block 760. FDE block 760 performs channel equalization in the frequency domain. Addition of CP allows this equalization to be one tap equalization in the frequency domain, which has low complexity. FDE can be performed using ZF, MMSE, or widely linear MMSE approaches.

The TDE block 730 may be utilized together with the FDE block 760 and DFT and IDFT blocks 750 and 770 or the TDE block 730 and the FDE block 760 (and corresponding DFT and IDFT blocks 750 and 770) may be utilized separately.

An output of any of the down-sampler 720, the TDE block 730, or the IDFT block 770, depending on what optional blocks are included at the receiver 700, is provided to a post-processor 780. In some embodiments, the post-processor 780 is able to effectively reduce the number of symbols from 2K OQAM symbols to K QAM symbols. For example, a down sampled signal having the form $\tilde{a}_1 + i\tilde{ia}_1$, $\tilde{b}_1 + i\tilde{b}_1$, $\tilde{a}_2 + i\tilde{ia}_2$, $\tilde{b}_2 + i\tilde{b}_2$, ..., $\tilde{a}_K + i\tilde{ia}_K$, $\tilde{b}_K + i\tilde{b}_K$ would be processed by extracting the real component of the first OQAM symbol and the imaginary component of the second OQAM symbol and combining those real and imaginary components into a complex QAM symbol. Therefore, the result is an output of $\tilde{a}_1 + i\tilde{b}_1, \tilde{a}_2 + i\tilde{b}_2, \ldots, \tilde{a}_K + i\tilde{b}_K$.

The receiver described with regard to FIG. 7, and described below with regard to FIG. 9, may be part of any type of device that is used to receive from a transmitting device. For example, the receiver may be part of a base station, access point or relay that is receiving from another device in a network, Examples of other devices that the receiver may receive from are a UE or a relay that receives from a UE. The receiver may be part of a UE that is receiving from a base station, access point relay station or another UE. The network may provide configuration information to the receiver, be it a base station or UE, pertaining to information the receiver needs to know to operate properly. Additional description regarding configuration information will be provided below.

FIG. 8A is a block diagram showing an example of a time domain implementation for single carrier DFT-s-OFDM transmitter 800. As with the OQAM transmitters in FIGS. 6A and 6B, the DFT-s-OFDM transmitter 800 may include an Add CP block 810, but this is an optional processing element. The Add CP block 810 may be used when there is frequency domain equalization (FDE) at the receiver end of a communication link.

When the Add CP block 810 is included in the DFT-s-OFDM transmitter 800, as shown in FIG. 8A, an input of K QAM symbols is provided to the Add CP block 810, which adds a CP to the sequence of K QAM symbols. As a result, the K QAM symbols become a sequence of $K+K_{CP}$ QAM symbols. The CP being added is an integer number of QAM symbols, not a particular number of samples as in the frequency domain implementation.

An output of the Add CP block 810, or the initial K QAM symbols is provided to an upsampler 820. The upsampler 820 upsamples the $K+K_{CP}$ QAM symbols and generates $N+N_{CP}$ upsampled QAM symbols in the process. The upsampling rate to generate the $N+N_{CP}$ upsampled OQAM symbols is $(N+N_{CP})/(K+K_{CP})$. If there is no Add CP block 810, the K QAM symbols are added to the upsampler 820, which upsamples the K QAM symbols and generates N upsampled QAM symbols in the process.

An output of upsampler 820 is provided to pulse shaping block 830. The pulse shaping block 830 performs a linear convolution with a square root Nyquist pulse with non zero component length J K in the frequency domain to create an output signal. In some embodiments, the square root Nyquist pulse is a root raised cosine pulse.

FIG. 8B is a block diagram showing an example of a time domain implementation for single carrier DFT-s-OFDM transmitter 850 with the addition of a windowing block 845. The single carrier DFT-s-OFDM transmitter 850 includes optional Add CP block 810, upsampler 825 and pulse shaping block 835 of a similar type to those included in single carrier DFT-s-OFDM transmitter 800 in FIG. 8A.

Figure 9:
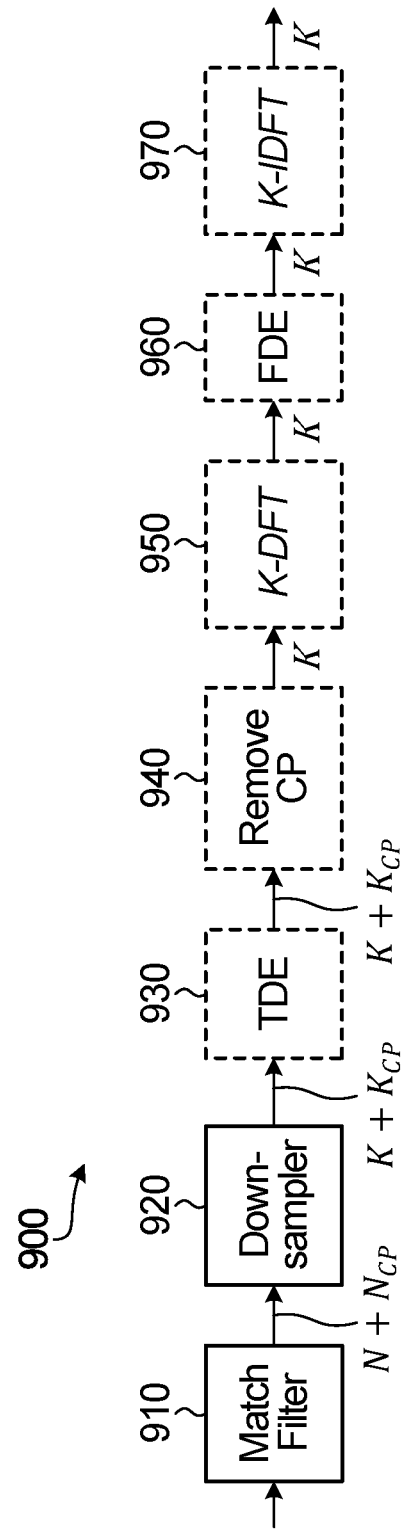
FIG. 9 illustrates a block diagram of a single carrier DFT-s-OFDM QAM receiver implemented in the time domain according to an embodiment of the present disclosure.

FIG. 9 is a block diagram showing an example of a time domain implementation for single carrier DFT-s-OFDM receiver 900. A received signal that has a CP as part of the signal is provided to a match filter 910, which produces a sequence of $N+N_{CP}$ upsampled symbols. The match filter uses the combined impulse response of the channel and the pulse to perform the filtering. A same type of square root Nyquist pulse used in the pulse shaping block at a transmitter that is transmitting the signal to the receiver is used in the match filter 910.

The output of $N+N_{CP}$ upsampled symbols from the match filter 910 is down-sampled by down-sampler 920. In some embodiments, a down-sampling rate may be $(K+K_{CP})/(N+N_{CP})$, which results in $K+K_{CP}$ symbols.

As with the receiver described with regard to FIG. 7, there are several optional processing blocks that may occur subsequent to the down-sampler 920. In some embodiments, there may be a TDE block 930. In some embodiments, if there was an Add CP processing block in a transmitter that is transmitting the signal to the receiver 900, there is a Remove CP processing block 940. In some embodiments, there may be a FDE block 960 together with both a DFT block 950 preceding the FDE block 960 and an IDFT block 970 subsequent to the FDE block 960. TDE may or may not be utilized when FDE is utilized. One, two or all three of these processing blocks may be part of the receiver. The receiver includes at least one of TDE or FDE.

If there is no CP in the signal, there is no need for a remove CP block 940, and there would be no additional $N_{CP}$ or $K_{CP}$ component output from the match filter 910, and therefore there would be no additional $K_{CP}$ output from the down-sampler 920 and the TDE block 930, if a TDE block 930 is part of the receiver 900, as currently shown in FIG. 9.

As embodiments described above support symbol lengths that are not fixed length factors of $2^N$, embodiments of the disclosure also provide methods for configuring parameters to support symbol lengths that are flexible.

In some embodiments, parameters such as the size of the cyclic prefix can be provided to the transmitter that are used by the Add CP processing block, if it is included in the transmitter. The cyclic prefix can be set based on the use of windowing or no windowing.

In some embodiments, parameters that pertain to the pulse shape processing are provided to the transmitter, for example whether the pulse shape is a conjugate symmetrical pulse, such as a root raised cosine pulse.

In addition to the transmitter being provided configuration information, the receiver is also provided information so that the receiver is arranged to work in a complementary manner with the transmitter, i.e. the match filter at the receiver uses a similar pulse to the pulse shaping of the transmitter the size of the cyclic prefix is the same in the transmitter and receiver.

The network may provide the configuration information to the transmitter and receiver so that the two devices work effectively together.

Figure 10:
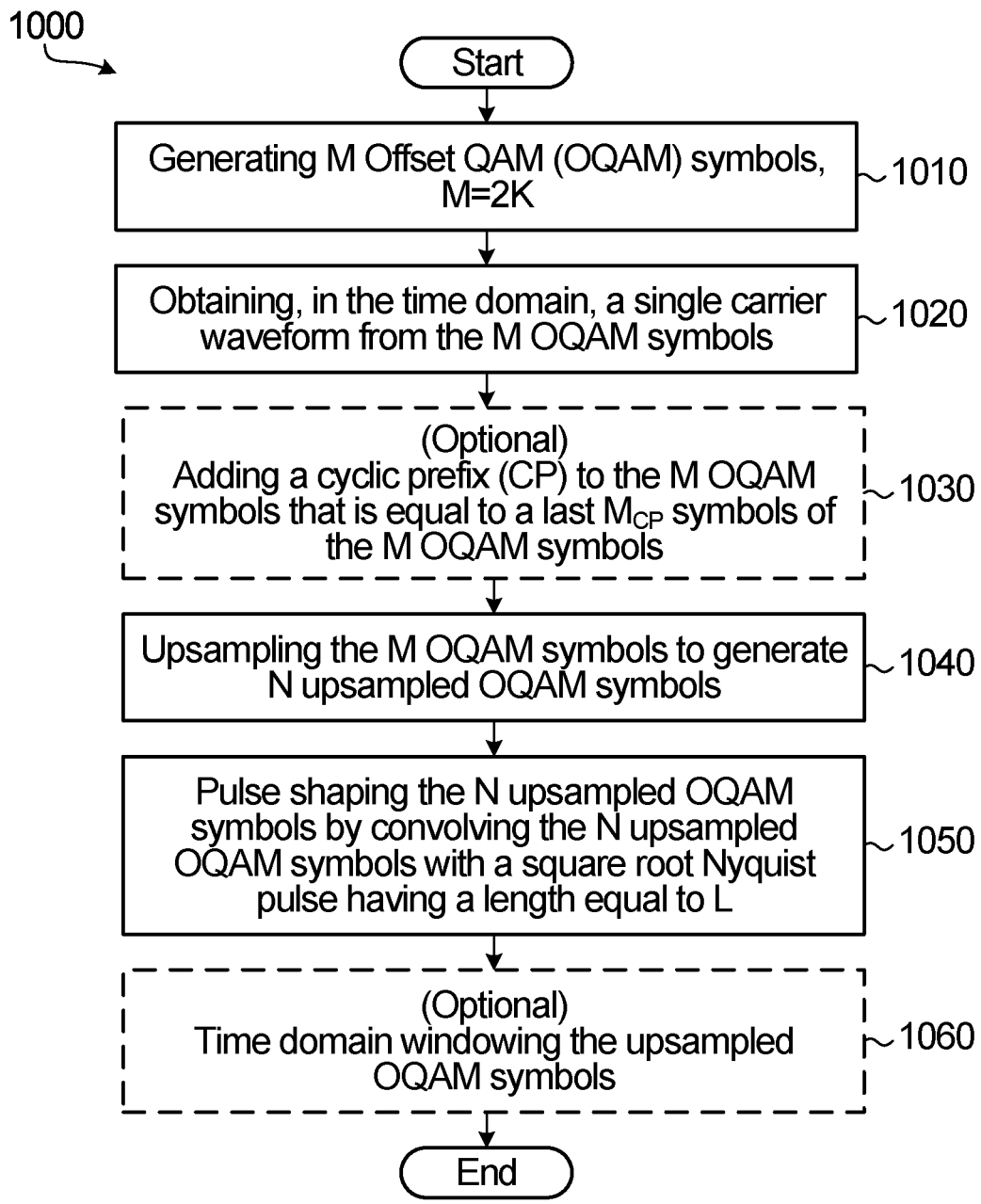
FIG. 10 is a flow chart illustrating an example method performed by a single carrier OQAM transmitter according to an embodiment of the present disclosure.

FIG. 10 is an example flow diagram 1000 that describes a method for use in a single carrier OQAM transmitter. The method involves at 1010 generating a M offset quadrature amplitude modulation (OQAM) symbols, M=2K, wherein K is a number of quadrature amplitude modulation (QAM) symbols. In some embodiments, generating the M Offset OQAM) symbols includes separating the K complex symbols into K symbols comprised of the K real components of the K complex symbols and another K symbols comprised of the K imaginary components of the K complex symbols, for a total of M=2K OQAM symbols.

At 1020, the method involves obtaining, in the time domain, a single carrier waveform from the M OQAM symbols. The process of generating, in the time domain, the single carrier waveform can include several processing steps.

An optional step 1030 involves adding a cyclic prefix (CP) to the M OQAM symbols that is equal to a last $M_{CP}$ symbols of the M OQAM symbols. In some embodiments, adding the CP to the M OQAM symbols involves adding a last $M_{CP}$ symbols of the M OQAM symbols as the CP, wherein the $M_{CP}$ symbols are $2K_{CP}$ symbols.

Another step 1040 involves upsampling the M OQAM symbols to generate N upsampled OQAM symbols. In some embodiments, the upsampling the M OQAM symbols to generate N upsampled OQAM symbols when the CP has been added involves using an upsampling rate of $(N+N_{CP})/[2*(K+K_{CP})]$.

A further step 1050 involves pulse shaping the N upsampled OQAM symbols by convolving the N upsampled OQAM symbols with a square root Nyquist pulse having a length equal to L.

In some embodiments, the K symbols are QAM symbols, and the K QAM symbols are complex symbols comprising real and imaginary components.

Another optional step 1060 involves, subsequent to pulse shaping, time domain windowing the upsampled OQAM symbols. The time domain windowing involves limiting a size of an output signal to a predetermined size. The time domain windowing may involve controlling a number of CP symbols being added to achieve the predetermined size.

Further steps that may be involved in the method, but that are not explicitly shown in the flow diagram 1000 include, for example, prior to pre-processing 1010, receiving configuration information for generating the single carrier waveform in the time domain or pulse shaping 1050 or windowing 1060, and transmitting the generated single carrier waveform.

Figure 11:
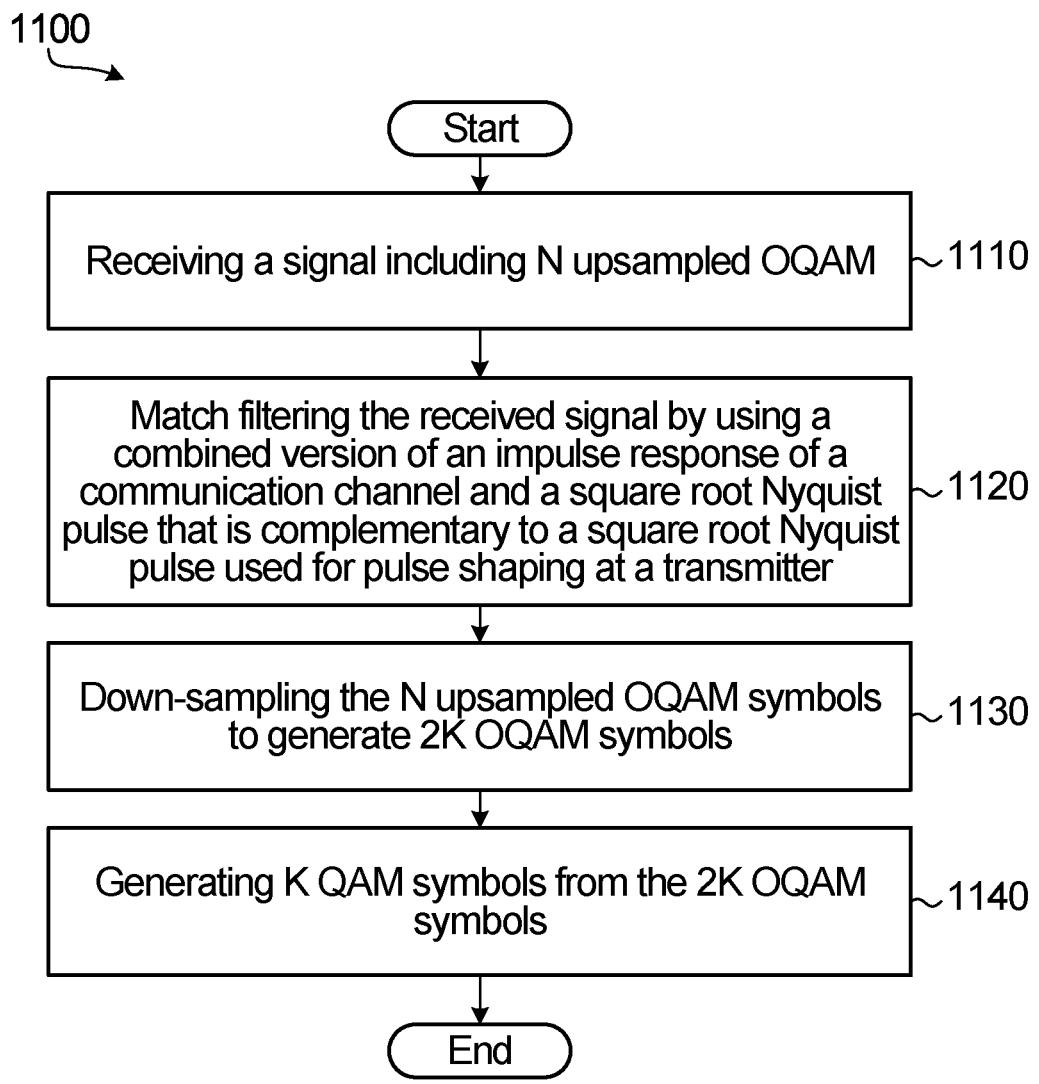
FIG. 11 is a flow chart illustrating an example method performed by a single carrier QAM receiver according to an embodiment of the present disclosure.

FIG. 11 is an example flow diagram 1100 that describes a method for use in a single carrier OQAM receiver. The method involves at 1110 receiving a signal including N upsampled offset OQAM. At step 1120, the method involves match filtering the received signal by using a combined version of an impulse response of a communication channel and a square root Nyquist pulse that is complementary to a square root Nyquist pulse used for pulse shaping at a transmitter. At step 1130 the method involves down-sampling the N upsampled OQAM symbols to generate 2K OQAM symbols. At step 1140, the method involves generating K QAM symbols from the 2K OQAM symbols. In some embodiments, generating the K QAM symbols involves combining K OQAM symbols of the 2K OQAM symbols as real components of the K QAM symbols and remaining K OQAM symbols of the 2K OQAM symbols as imaginary components of the K QAM symbols.

In some embodiments, the received signal has a CP and the received signal has $N+N_{CP}$ upsampled OQAM symbols. In such embodiments, match filtering the N upsampled OQAM symbols comprises match filtering the $N+N_{CP}$ upsampled OQAM symbols and down-sampling the N upsampled OQAM symbols to generate 2K OQAM symbols comprises down-sampling the $N+N_{CP}$ upsampled OQAM symbols to generate $2(K+K_{CP})$ OQAM symbols. In addition, prior to performing processing of the 2K OQAM symbols, removing the CP from an end of the $2(K+K_{CP})$ OQAM symbols resulting in 2K OQAM symbols.

In some embodiments, when CP is included in the received signal, prior to removing the CP, time domain equalization may be performed.

In some embodiments, when CP is included in the received signal, subsequent to removing the CP, frequency domain equalization may be performed that includes performing a 2K point discrete Fourier transform (DFT); the frequency domain equalization; and a 2K point inverse discrete Fourier transform (IDFT).

Further steps that may be involved in the method, but that are not explicitly shown in the flow diagram 1000 include, for example, prior to receiving step 1110, receiving configuration information for enabling match filtering of the received signal 1120, down-sampling 1130 of the OQAM symbols and performing processing 1140 of the 2K OQAM symbols.

Figure 12:
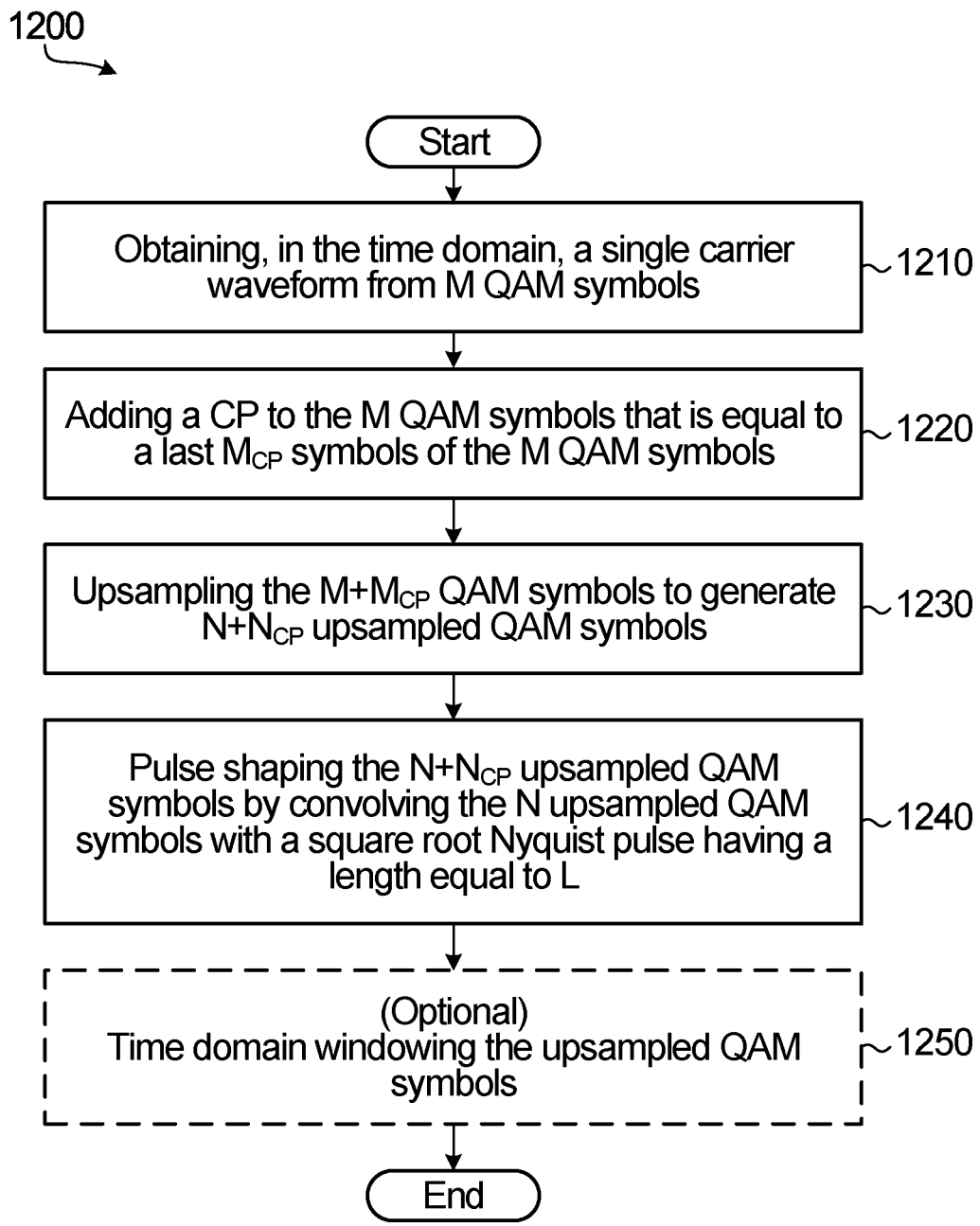
FIG. 12 is a flow chart illustrating an example method performed by a single carrier DFT-s-OFDM transmitter according to an embodiment of the present disclosure.

FIG. 12 is an example flow diagram 1200 that describes a method for use in a DFT-s-OFDM transmitter. The method involves at 1210 obtaining, in the time domain, a single carrier waveform from M QAM symbols. The process of obtaining, in the time domain, the single carrier waveform can include several processing steps. Step 1220 involves adding a CP to the M QAM symbols equal to a number $M_{CP}$ of the QAM symbols. In some embodiments adding the CP to the M QAM symbols involves adding a last $M_{CP}$ symbols of the M QAM symbols to the beginning of the M QAM symbols resulting in the $M+M_{CP}$ QAM symbols.

Step 1230 involves upsampling the $M+M_{CP}$ QAM symbols to generate $N+N_{CP}$ upsampled QAM symbols. In some embodiments, upsampling the M QAM symbols to generate N upsampled QAM symbols involves using an upsampling rate of $(N+N_{CP})/(M+M_{CP})$.

Step 1240 involves pulse shaping the $N+N_{CP}$ upsampled QAM symbols by convolving the $N+N_{CP}$ upsampled QAM symbols with a square root Nyquist pulse having a length equal to L.

Another optional step 1250 involves, subsequent to pulse shaping, time domain windowing the upsampled QAM symbols. The time domain windowing involves limiting a size of an output signal to a predetermined size. The time domain windowing may involve controlling a number of CP symbols being added to achieve the predetermined size.

Further steps that may be involved in the method, but that are not explicitly shown in the flow diagram 1200 include, for example, prior to pre-processing 1210, receiving configuration information for generating the single carrier waveform in the time domain or pulse shaping 1240 or windowing 1250, and transmitting the generated single carrier waveform.

Figure 13:
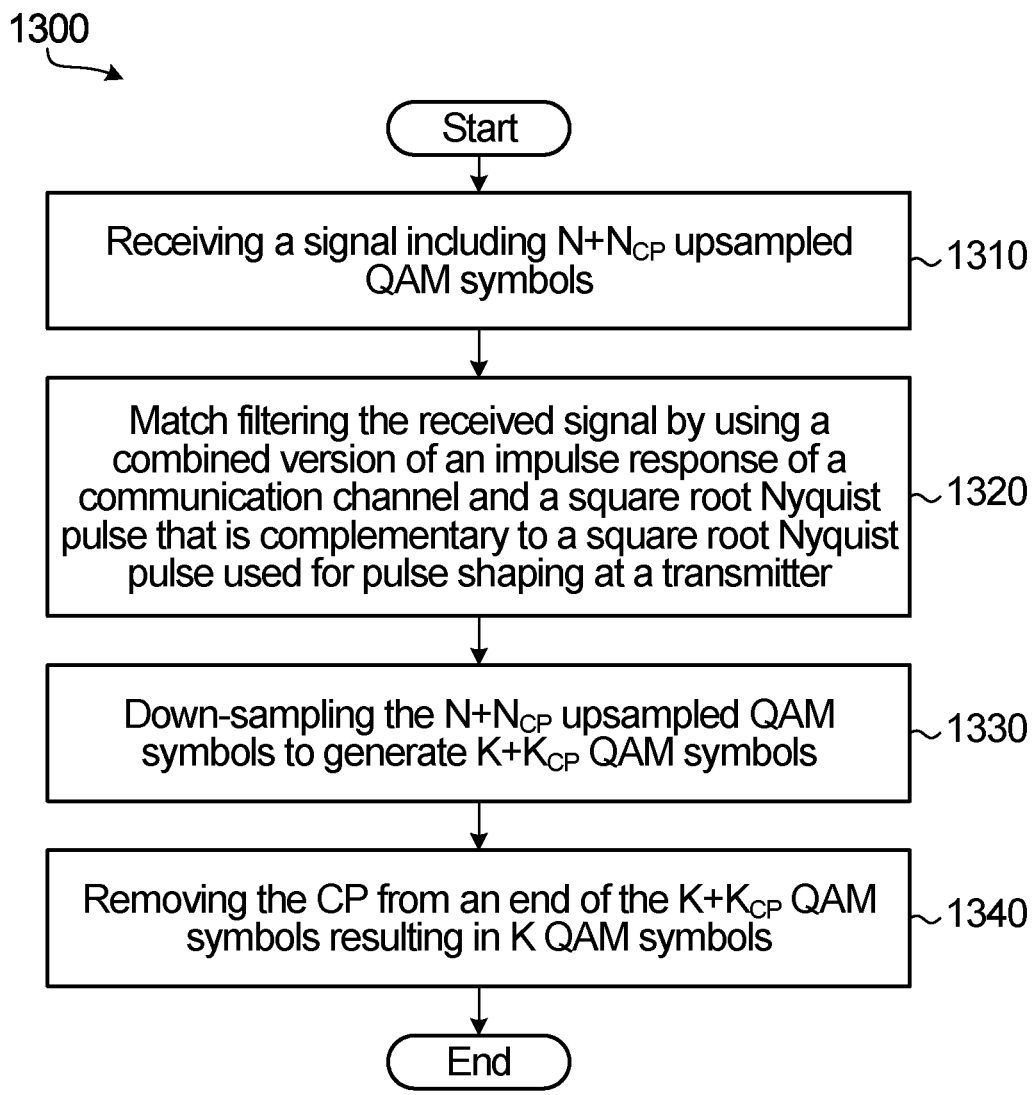
FIG. 13 is a flow chart illustrating an example method performed by a single carrier QAM receiver according to an embodiment of the present disclosure.

FIG. 13 is an example flow diagram 1300 that describes a method for use in a single carrier QAM receiver. The method involves at 1310 receiving a signal including $N+N_{CP}$ upsampled QAM symbols. At step 1320, the method involves match filtering the received signal by using a combined version of an impulse response of a communication channel and a square root Nyquist pulse that is complementary to a square root Nyquist pulse used for pulse shaping at a transmitter. At step 1330, the method involves down-sampling the $N+N_{CP}$ upsampled QAM symbols to generate $K+K_{CP}$ QAM symbols. At step 1340, the method involves removing the CP from an end of the $K+K_{CP}$ QAM symbols resulting in K QAM symbols.

In some embodiments, prior to removing the CP, time domain equalization may be performed.

In some embodiments, subsequent to removing the CP, frequency domain equalization may be performed that includes performing a K point DFT; the frequency domain equalization; and a K point IDFT.

Further steps that may be involved in the method, but that are not explicitly shown in the flow diagram 1300 include, for example, prior to receiving step 1310, receiving configuration information for enabling match filtering of the received signal 1320, down-sampling 1330 of the OQAM symbols and removing 1340 the CP.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
generating M Offset QAM (OQAM) symbols, M=2K, wherein K is a number of quadrature amplitude modulation (QAM) symbols;
obtaining, in the time domain, a single carrier waveform based on M OQAM symbols by:
  upsampling the M OQAM symbols to generate N upsampled OQAM symbols; and
  pulse shaping the N upsampled OQAM symbols by convolving the N upsampled OQAM symbols with a square root Nyquist pulse having a length equal to L.

2. The method of claim 1 further comprising:
adding a cyclic prefix (CP) to the M OQAM symbols that is equal to a last $M_{CP}$ symbols of the M OQAM symbols;
wherein upsampling the M OQAM symbols to generate N upsampled OQAM symbols comprises upsampling the $M+M_{CP}$ OQAM symbols to generate $N+N_{CP}$ upsampled OQAM symbols; and
wherein pulse shaping the N upsampled OQAM symbols comprises pulse shaping the $N+N_{CP}$ upsampled OQAM symbols by convolving the $N+N_{CP}$ upsampled OQAM symbols with a square root Nyquist pulse having L sample points.

3. The method of claim 1, wherein the K symbols are QAM symbols, wherein the K QAM symbols are complex symbols comprising real and imaginary components.

4. The method of claim 1, before the generating step, further comprising performing pre-processing that comprises generating M OQAM symbols by separating the K complex symbols into K symbols comprised of the K real components of the K complex symbols and another K symbols comprised of the K imaginary components of the K complex symbols, for a total of M=2K OQAM symbols.

5. The method of claim 4, further comprising:
adding a cyclic prefix (CP) to the M OQAM symbols comprises adding a last $M_{CP}$ symbols of the M OQAM symbols as the CP, wherein the $M_{CP}$ symbols are $2K_{CP}$ symbols.

6. The method of claim 4, wherein the upsampling the M OQAM symbols to generate N upsampled OQAM symbols comprises using an upsampling rate of $(N+N_{CP})/[2*(K+K_{CP})]$.

7. A method comprising:
receiving a single carrier waveform including N upsampled offset OQAM symbols;
in the time domain, match filtering the received single carrier waveform by using a combined version of an impulse response of a communication channel and a square root Nyquist pulse that is complementary to a square root Nyquist pulse used for pulse shaping at a transmitter; and
down-sampling the N upsampled OQAM symbols to generate 2K OQAM symbols; and
generating K QAM symbols from the 2K OQAM symbols.

8. The method of claim 7 further comprising, when the received single carrier waveform has a cyclic prefix (CP) and the received single carrier waveform has $N+N_{CP}$ upsampled OQAM symbols:
match filtering the N upsampled OQAM symbols comprises match filtering the $N+N_{CP}$ upsampled OQAM symbols;
down-sampling the N upsampled OQAM symbols to generate 2K OQAM symbols comprises down-sampling the $N+N_{CP}$ upsampled OQAM symbols to generate $2(K+K_{CP})$ OQAM symbols; and
prior to generating the K QAM symbols, removing the CP from an end of the $2(K+K_{CP})$ OQAM symbols resulting in 2K OQAM symbols.

9. The method of claim 7, wherein the generating the K QAM symbols comprises combining K OQAM symbols of the 2K OQAM symbols as real components of the K QAM symbols and remaining K OQAM symbols of the 2K OQAM symbols as imaginary components of the K QAM symbols.

10. The method of claim 8 further comprising prior to removing the CP, performing time domain equalization.

11. The method of claim 8 further comprising subsequent to removing the CP, performing:
a 2K point discrete Fourier transform (DFT);
frequency domain equalization; and
a 2K point inverse discrete Fourier transform (IDFT).

12. The method of claim 7 further comprising receiving configuration information for one or more of receiving the single carrier waveform, match filtering the received single carrier waveform, and down-sampling the N upsampled OQAM symbols in the time domain.

13. A device comprising:
a processor; and
a computer-readable medium having stored thereon computer executable instructions, that when executed by the processor, cause the device to:
  generate M Offset QAM (OQAM) symbols, M=2K, wherein K is a number of quadrature amplitude modulation (QAM) symbols;
  obtain, in the time domain, a single carrier waveform based on M OQAM symbols by:
    upsampling the M OQAM symbols to generate N upsampled OQAM symbols; and
    pulse shaping the N upsampled OQAM symbols by convolving the N upsampled OQAM symbols with a square root Nyquist pulse having a length equal to L.

14. The device of claim 13, the computer executable instructions further cause the device to:
add a cyclic prefix (CP) to the M OQAM symbols that is equal to a last $M_{CP}$ symbols of the M OQAM symbols;
wherein upsampling the M OQAM symbols to generate N upsampled OQAM symbols comprises upsampling the $M+M_{CP}$ OQAM symbols to generate $N+N_{CP}$ upsampled OQAM symbols; and
wherein pulse shaping the N upsampled OQAM symbols comprises pulse shaping the $N+N_{CP}$ upsampled OQAM symbols by convolving the $N+N_{CP}$ upsampled OQAM symbols with a square root Nyquist pulse having L sample points.

15. The device of claim 13, wherein the K symbols are QAM symbols, wherein the K QAM symbols are complex symbols comprising real and imaginary components.

16. The device of claim 13, the computer executable instructions further cause the device to, before the generate step, generate M OQAM symbols by separating the K complex symbols into K symbols comprised of the K real components of the K complex symbols and another K symbols comprised of the K imaginary components of the K complex symbols, for a total of M=2K OQAM symbols.

17. The device of claim 16, the computer executable instruction further cause the device to:

add a cyclic prefix (CP) to the M OQAM symbols that comprises adding a last $M_{CP}$ symbols of the M OQAM symbols as the CP, wherein the $M_{CP}$ symbols are $2K_{CP}$ symbols.

18. The device of claim 16, wherein the upsampling the M OQAM symbols to generate N upsampled OQAM symbols comprises using an upsampling rate of $(N+N_{CP})/[2*(K+K_{CP})]$.

19. A device comprising:
a processor; and
a computer-readable medium having stored thereon computer executable instructions, that when executed by the processor, cause the device to:
receive a single carrier waveform including N upsampled offset OQAM symbols;
in the time domain, match filter the received single carrier waveform by using a combined version of an impulse response of a communication channel and a square root Nyquist pulse that is complementary to a square root Nyquist pulse used for pulse shaping at a transmitter; and
down-sample the N upsampled OQAM symbols to generate 2K OQAM symbols; and
generate K QAM symbols from the 2K OQAM symbols.

20. The device of claim 19, the computer executable instruction further cause the device to, when the received single carrier waveform has a cyclic prefix (CP) and the received single carrier waveform has $N+N_{CP}$ upsampled OQAM symbols:
match filter the N upsampled OQAM symbols comprises match filtering the $N+N_{CP}$ upsampled OQAM symbols;
down-sample the N upsampled OQAM symbols to generate 2K OQAM symbols comprises down-sampling the $N+N_{CP}$ upsampled OQAM symbols to generate $2(K+K_{CP})$ OQAM symbols; and
prior to generating the K QAM symbols, remove the CP from an end of the $2(K+K_{CP})$ OQAM symbols resulting in 2K OQAM symbols.

21. The device of claim 19, wherein the computer executable instructions to generate the K QAM symbols comprise computer executable instructions to cause the device to combine K OQAM symbols of the 2K OQAM symbols as real components of the K QAM symbols and remaining K OQAM symbols of the 2K OQAM symbols as imaginary components of the K QAM symbols.

22. The device of claim 20, the computer executable instructions further cause the device to, prior to removing the CP, perform time domain equalization.

23. The device of claim 20, the computer executable instructions further cause the device to, subsequent to removing the CP, perform:
a 2K point discrete Fourier transform (DFT);
frequency domain equalization; and
a 2K point inverse discrete Fourier transform (IDFT).

24. The device of claim 19, the computer executable instructions further cause the device to receive configuration information for one or more of receiving the single carrier waveform, match filtering the received single carrier waveform, and down-sampling the N upsampled OQAM symbols in the time domain.

* * * * *